US011599551B2

(12) United States Patent
Hegarty et al.

(10) Patent No.: US 11,599,551 B2
(45) Date of Patent: Mar. 7, 2023

(54) DESERIALIZATION OF STREAM OBJECTS USING MULTIPLE DESERIALIZATION ALGORITHMS

(71) Applicant: Oracle International Corporation, Redwood Shores, CA (US)

(72) Inventors: Chris Hegarty, Dublin (IE); Alexander R. Buckley, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 265 days.

(21) Appl. No.: 16/834,239

(22) Filed: Mar. 30, 2020

(65) Prior Publication Data

US 2021/0303587 A1 Sep. 30, 2021

(51) Int. Cl.
*G06F 16/25* (2019.01)
*G06F 16/178* (2019.01)
*G06F 12/02* (2006.01)

(52) U.S. Cl.
CPC ........ *G06F 16/258* (2019.01); *G06F 16/1794* (2019.01); *G06F 12/0223* (2013.01); *G06F 2212/154* (2013.01)

(58) Field of Classification Search
CPC ............... G06F 16/258; G06F 12/0223; G06F 2212/154; G06F 16/1794
See application file for complete search history.

(56) References Cited

U.S. PATENT DOCUMENTS

| 4,829,471 | A | 5/1989 | Banerjee et al. |
| 5,161,223 | A | 11/1992 | Abraham |
| 5,684,984 | A | 11/1997 | Jones et al. |
| 6,173,327 | B1 | 1/2001 | De et al. |
| 6,477,701 | B1* | 11/2002 | Heistermann ........... G06F 9/465 707/999.203 |
| 6,633,888 | B1 | 10/2003 | Kobayashi |
| 7,031,904 | B1 | 4/2006 | Wilson et al. |
| 10,048,959 | B2 | 8/2018 | Sun |
| 10,713,197 | B2 | 7/2020 | Park et al. |
| 11,296,961 | B2 | 4/2022 | Layman et al. |
| 11,327,991 | B2 | 5/2022 | Reynolds et al. |
| 2005/0114871 | A1 | 5/2005 | Wolff et al. |
| 2006/0047685 | A1 | 3/2006 | Dearing et al. |
| 2007/0156756 | A1* | 7/2007 | Stoyanova ............ G06F 16/958 |

(Continued)

OTHER PUBLICATIONS

Title: A technique for dynamic updating of Java software, author: A Orso,, published on 2002.

(Continued)

*Primary Examiner* — Alford W Kindred
*Assistant Examiner* — Lin Lin M Htay
(74) *Attorney, Agent, or Firm* — Invoke

(57) ABSTRACT

Techniques for deserializing stream objects are disclosed. The system may receive data representing a stream object. The data can include an object descriptor, a class descriptor, and stream field values corresponding to the stream object. The system may select a particular deserialization process, from among a plurality of deserialization processes. The selection may be based at least in part on the object descriptor and the class descriptor. The system can deserialize the data representing the stream object using the selected deserialization process, yielding one or more deserialized objects.

27 Claims, 29 Drawing Sheets

(56) References Cited

U.S. PATENT DOCUMENTS

| | | | |
|---|---|---|---|
| 2007/0168949 | A1 | 7/2007 | Shattuck et al. |
| 2007/0299863 | A1* | 12/2007 | Fu .................. G06F 9/4493 707/999.102 |
| 2008/0163078 | A1 | 7/2008 | Van et al. |
| 2009/0037807 | A1 | 2/2009 | Kuznetsov et al. |
| 2011/0206381 | A1 | 8/2011 | Ji et al. |
| 2011/0218981 | A1 | 9/2011 | Retnakumari et al. |
| 2012/0054452 | A1 | 3/2012 | Kumar et al. |
| 2013/0007027 | A1* | 1/2013 | Hazel ................ G06F 16/258 707/756 |
| 2013/0117405 | A1* | 5/2013 | Ebdon ................ G06F 9/548 709/213 |
| 2013/0305012 | A1 | 11/2013 | Hopley |
| 2015/0199080 | A1 | 7/2015 | Pletter et al. |
| 2015/0268878 | A1 | 9/2015 | Amit et al. |
| 2015/0286609 | A1 | 10/2015 | Hahn et al. |
| 2018/0052708 | A1 | 2/2018 | Ganesan et al. |
| 2018/0075107 | A1* | 3/2018 | Park .................. G06F 16/9024 |
| 2019/0215157 | A1 | 7/2019 | Guo et al. |
| 2021/0064380 | A1 | 3/2021 | Mai et al. |

OTHER PUBLICATIONS

Title: Exploiting local similarity for indexing paths in graph-structured data, Author: R Kaushik, published on 2002.

3.1 The ObjectInputstream Class, in the Java Serialization Specification, available online at < https://docs.oracle.com/en/java/javase/15/docs/specs/records-serialization.html#the-objectinputstream-class>, 46 pages.

4.12.5. Initial Values of Variables, in Chapter 4, Types, Values, and Variables in the Java (Registered) Language Specification Java SE 15 Edition, available online at < https://docs.oracle.com/javase/specs/jls/se15/html/jls-4.html#jls-4.12.5 >, 24 pages.

4.4.10. The CONSTANT_Dynamic_info and CONSTANT_InvokeDynamic_info Structures, in Chapter 4, The class File Format, in The Java (Registered) Virtual Machine Specification Java SE 15 Edition, available online at < https://docs.oracle.com/javase/specs/jvms/se15/html/jvms-4.html#jvms-4.4.10 >, 95 pages.

All together now: A shortcut for ©ToString , ©EqualsAndHash Code , ©Getter on all fields, ©Setter on all non-final fields, and ©RequiredArgsConstructor, available online at < https://projectlombok.org/features/Data >, 5 pages.

Constructors made to order: Generates constructors that take no arguments, one argument per final / non-null field, or one argument for every field, availavle online at < https://projectlornbok.org/features/constructor >, 3 pages.

FlatBuffers White Paper, available online at < https://google.github.io/flatbuffers/flatbuffers_white_paper.html >, 3 pages.

Hegarty et al., "Record Serialization" in Inside Java, available online at < https://inside.java/2020/07/20/record-serialization/ >, Jul. 20, 2020, 6 pages.

Java Object Serialization Specification: 1—System Architecture, available online at < https://docs.oracle.com/en/java/javase/15/docs/specs/serialization/serial-arch.html >, 8 pages.

Java.beans, Class XMLEncoder, available online at < https://docs.oracle.com/javase/7/docs/api/java/beans/XMLEncoder.html >, 6 pages.

JEP 309: Dynamic Class-File Constants, available online at < https://openjdk.java.net/jeps/309 >, 4 pages.

JEP 384: Records (Second Preview), available online at < https://openjdk.java.net/jeps/384 >, (2020), 8 pages.

Rose, "Bytecodes meet Combinators: invokedynamic on the JVM," avaolable online at < https://cr.openjdkjava.net/~jrose/pres/200910-VMIL.pdf >,11 pages.

* cited by examiner

| Known Object Table | |
|---|---|
| Handle 1 | NULL |

FIG. 12A

| Known Object Table | |
|---|---|
| Handle 1 | NULL |
| Handle 2 | NULL |

FIG. 12B

DESERIALIZATION OF STREAM OBJECTS USING MULTIPLE DESERIALIZATION ALGORITHMS

RELATED APPLICATIONS; INCORPORATION BY REFERENCE

This application is related to U.S. patent application Ser. No. 16/834,139, filed Mar. 30, 2020, titled "SERIALIZATION OF OBJECTS USING MULTIPLE SERIALIZATION ALGORITHMS", which is hereby incorporated by reference.

TECHNICAL FIELD

The present disclosure relates to serialization and deserialization of objects. In particular, the present disclosure relates to deserialization of objects using multiple deserialization algorithms.

BACKGROUND

In the context of data storage, serialization is a process by which data structures and/or object states are translated (e.g., encoded) into a data stream format that can be stored (e.g., in a file or memory buffer) or transmitted (e.g., across a network connection link) and reconstructed later (possibly in a different computer environment). During deserialization, the resulting data stream is read according to the serialization format, and can be used to create an object that is semantically identical to the original object, with the exception of any members of the original object that are excluded from serialization (e.g., object members marked as transient). For many complex objects, such as those that make extensive use of references, this process is not straightforward.

Java provides automatic serialization for objects when the classes of the objects implement the java.io.Serializable interface. Implementing this interface marks the class as "okay to serialize", and Java then handles serialization internally. The standard encoding method uses a recursive graph-based translation of the object's class descriptor and serializable fields into a data stream. Primitives as well as non-transient, non-static referenced objects are encoded into the stream. Each object that is referenced by the serialized object via a field that is not marked as transient must also be serialized. If any object in the complete graph of non-transient object references is not serializable, then serialization will fail. However, serialization may allow access to non-transient private members of a class that are not otherwise accessible. Types containing sensitive information (for example, a password) should not be serializable.

Types that are "data carriers" (e.g., simple aggregates of data) are often viewed as requiring significant effort to implement. To write a data carrier class properly, a user must write a significant amount of repetitive, error-prone code: constructors, accessors, methods including equals( ), hashCode( ), toString( ), etc. Developers are sometimes tempted to cut corners such as omitting these important methods, which can lead to surprising behavior or poor debuggability. Alternatively, a developer may try to utilize an alternate but not entirely appropriate class to avoid declaring an appropriate new data carrier class. Finally, a developer may declare a record class that directly indicates data to be aggregated (e.g., using the declaration record Point (int x, int y) { }).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 12A-12J illustrate example system states during a second deserialization process, in accordance with one or more embodiments.

DETAILED DESCRIPTION

Figure 1:
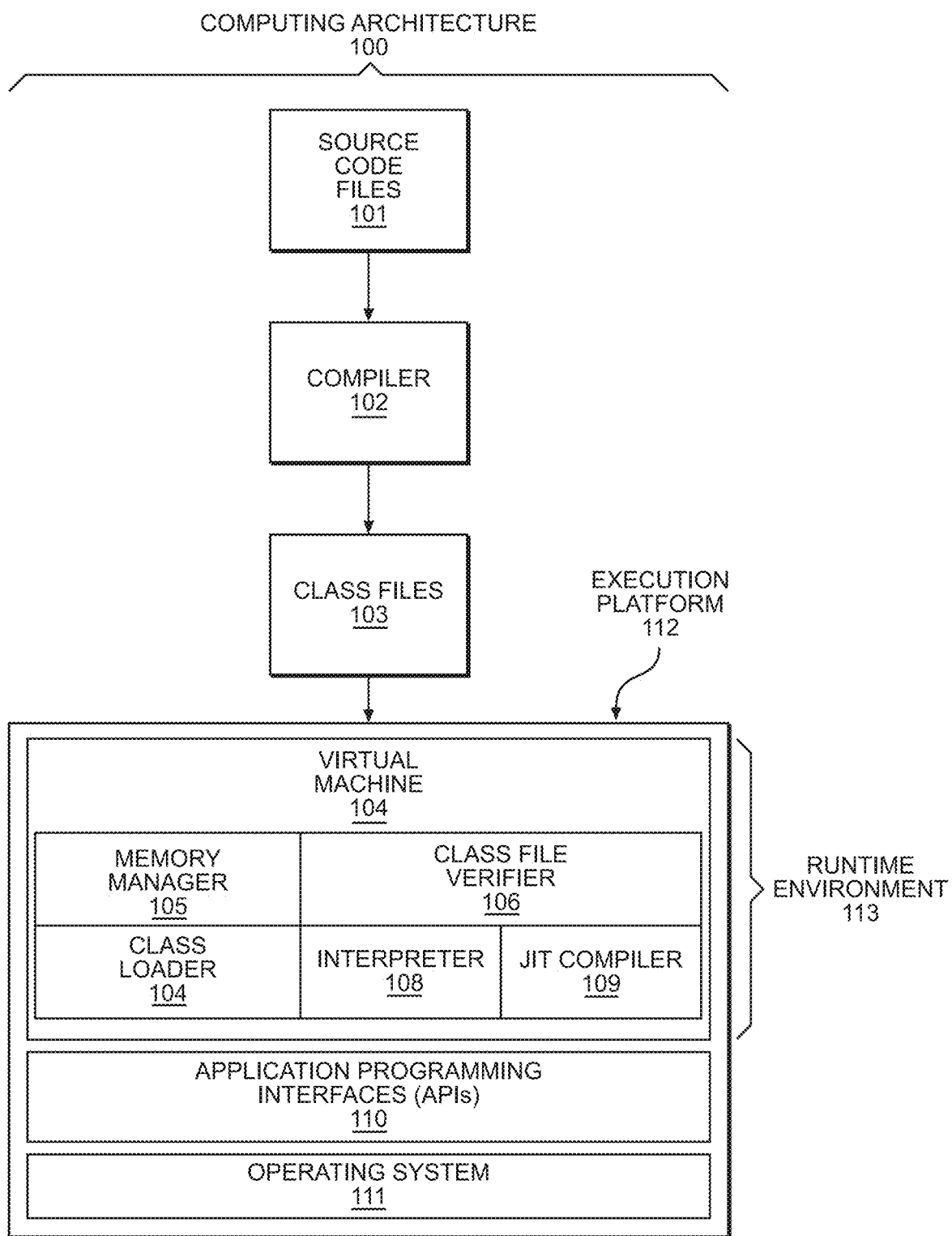
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. IMMUTABLE OBJECTS

4. SERIALIZATION
5. DESERIALIZATION
   5.1 SELECTION OF DESERIALIZATION ALGORITHM
   5.2 OBJECT DESERIALIZATION
      5.2.1 TRADITIONAL DESERIALIZATION ALGORITHM
      5.2.2 TEMPORALLY SPLIT DESERIALIZATION ALGORITHM
      5.2.3 RECORD DESERIALIZATION ALGORITHM
      5.2.4 DEFERRED HANDLE GENERATION DESERIALIZATION ALGORITHM
6. ILLUSTRATIVE EXAMPLES
   6.1 DESERIALIZATION USING TRADITIONAL DESERIALIZATION ALGORITHM
   6.2 DESERIALIZATION USING TEMPORALLY SPLIT DESERIALIZATION ALGORITHM
   6.3 DESERIALIZATION USING RECORD DESERIALIZATION ALGORITHM
   6.4 DESERIALIZATION USING DEFERRED HANDLE GENERATION DESERIALIZATION ALGORITHM
7. MISCELLANEOUS; EXTENSIONS
8. HARDWARE OVERVIEW

1. General Overview

Object-oriented applications may contain complex webs of interrelated objects. Each object has a unique identity (e.g., indicated by an address of the object in memory) and consists of zero or more fields. An object may refer to another object by having a field whose value is the address of the other object. The first object is said to "refer" to the second object. Accordingly, objects may be "shared" by virtue of fields in multiple objects all referring to the same object (e.g., having the same address value). Each object may be instantiated from a class, and the class may define a number of constructors to initialize the values in the fields of a newly instantiated object.

The web of objects is called an object graph. Objects make up the nodes of the object graph, while references between objects (due to a first object's field referring to a second object) are represented by directed edges between the nodes. An object graph is a view of an object-oriented application at a particular point in time. In particular, an object graph is a directed graph, which may be cyclic. That is, a cycle is possible between two objects, but only if one object includes at least one field whose value can be modified after the object was instantiated. Cycles are a valuable tool for using objects to model the real world, but can lead to bugs and security issues in programs.

Classes can declare fields to be final, so that an object's fields can only have their values set by the class's constructor (e.g., when the object is instantiated); those fields cannot be modified by any other code inside or outside the class at a later time. That is, the object can include immutable fields. Some classes are immutable (e.g., all fields of the class are declared final) and some are mutable (e.g., at least one field of the class is not declared final). For example, a record class in Java is immutable. An object instantiated from an immutable class is called an immutable object; the values of the object's fields are set exactly once. An object instantiated from a mutable class is called a mutable object. Immutable objects are preferred for security reasons and because the immutability of the objects prevents the presence of cycles between the objects, thus avoiding bugs.

Serializing an object means creating a representation of the object plus the transitive closure of the objects it refers to, by recursively enumerating the values of the fields of the object. Details of the representation may vary between embodiments; the representation may be a binary file ("data stream") or a textual file (e.g., XML, JSON, CSV). Similarly, the representation may be stored on a disk, held in memory, or transmitted over a network connection. Similarly, deserialization means creating one or more new objects that substantially correspond to the representation. For a graph of objects, if two separate objects each refer to the same third object, serializing the graph of these three objects should result in the third object (and its associated fields) appearing in the representation once, not twice. Similarly, when the representation is deserialized, the object recreated for the third object should be referred to by both the objects recreated for the objects that referred to the third object.

The serialization of an object triggers the assignment of a handle for the object. The serialization of a first object may lead to the serialization of a second object. Thereafter, if another object refers to an already-serialized object, the serialization may reference the object handle, rather than re-serializing the referenced object. Correspondingly, the deserialization of an object triggers the assignment of a handle for the new object. So, the deserialization of a first object leads to the deserialization of a second object. Thereafter, during deserialization an object may simply refer to an object's assigned handle rather than including all values for the object. This helps to ensure that the deserialized objects retain the same shared object relationships.

One or more embodiments select a deserialization process for deserializing a serialized object that is represented as a data stream. The format of the stream is the same for immutable objects and mutable objects. However, the way in which immutable objects are deserialized is different. In particular, during the deserialization of a mutable object, an instance of the object is created, a handle is assigned for that newly created object and added to the set of known objects, the stream fields are deserialized, and the stream field values are assigned to the previously created object's fields. In contrast, when deserializing an immutable object, a handle with an initial value of null is added to the set of known objects. Stream field values are deserialized, and the immutable object is created by invoking its canonical constructor with the appropriate corresponding matching deserialized values. After creation of the object, the handle is assigned the newly created record object (e.g., by updating the null handle value).

The key difference between these processes is the time between when the deserialized object is created and when its handle is added to the set of known objects. For mutable objects, the object is created, and the handle is assigned to that object and added to the set of known objects as a single atomic operation. For immutable objects, the handle is assigned to a sentinel value and the stream fields are deserialized; thereafter, the object is instantiated and the handle assigned to the record object. That is, for immutable objects there is a temporal split between the creation of the handle and the instantiation of the object.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionalities than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of types (e.g., classes), an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
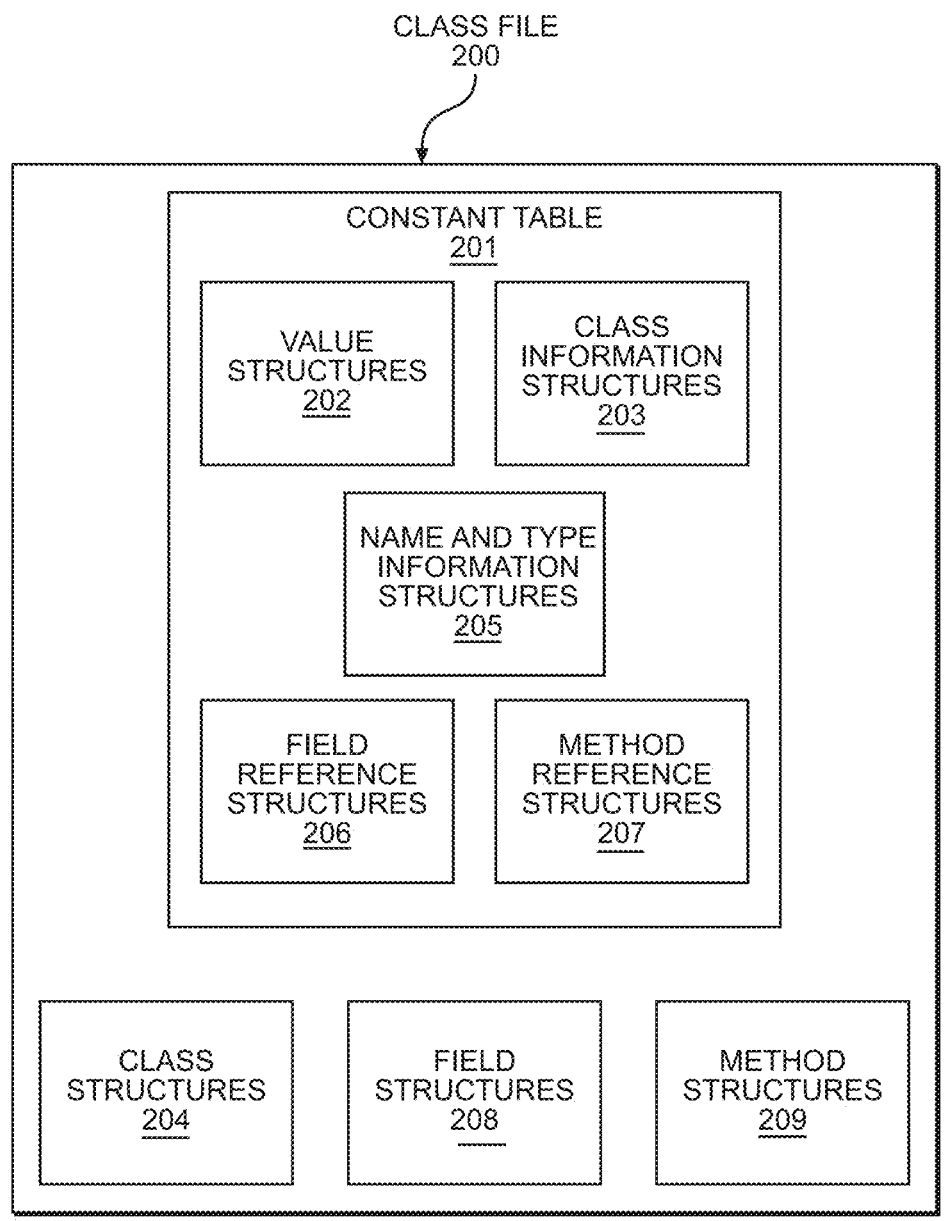
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
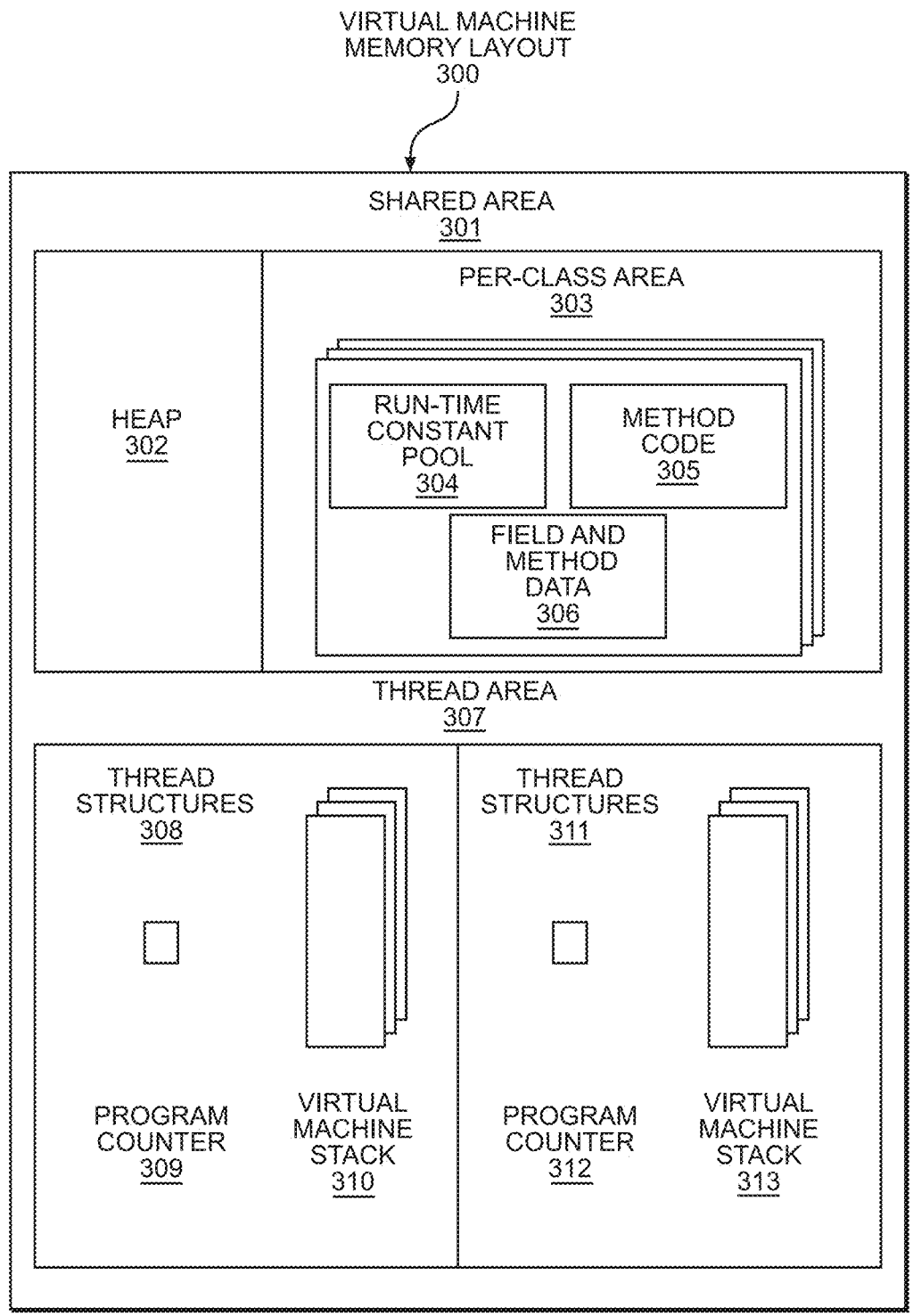
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
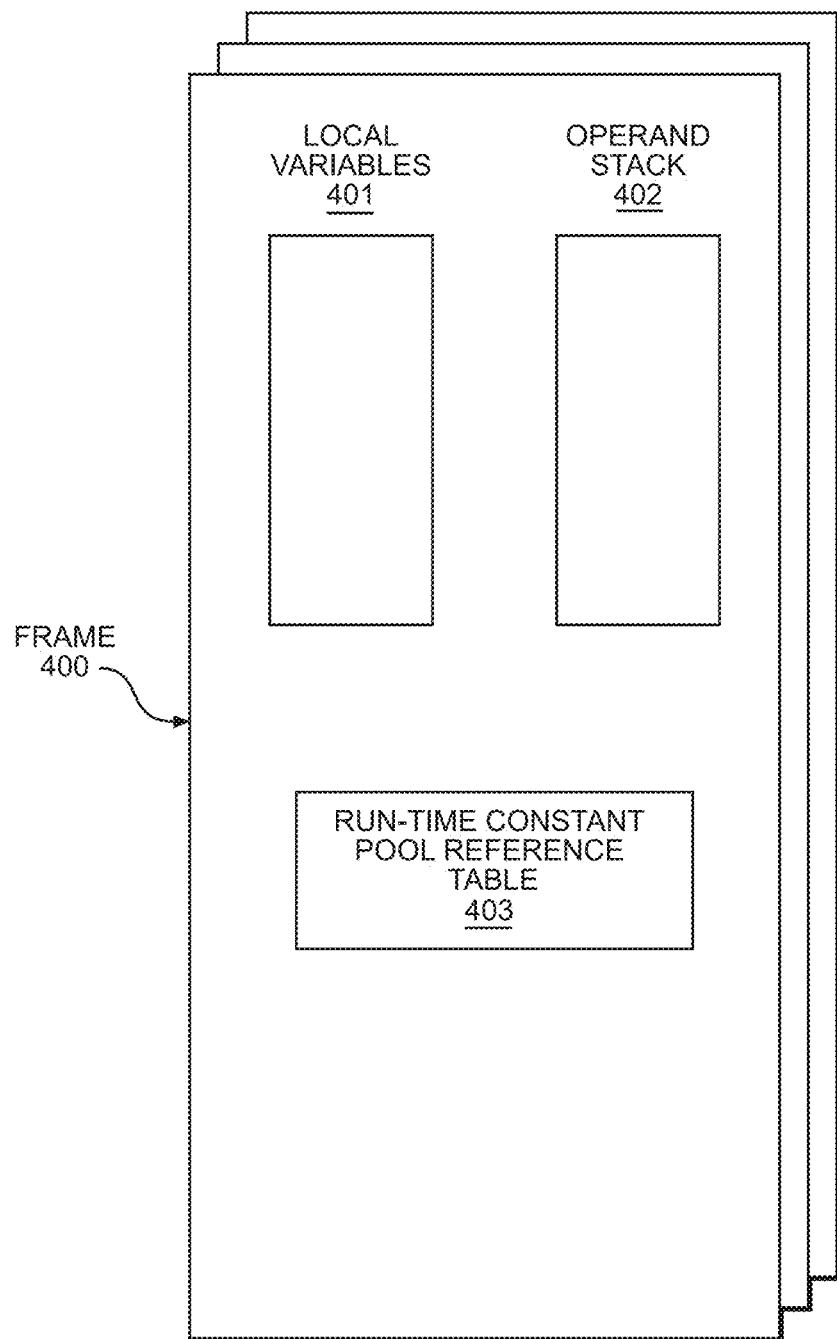
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Immutable Objects

Immutable objects include data elements that are set by a constructor and cannot be modified following construction of the associated object. That is, each data element of the object is immutable. One particular type of immutable object in the Java language is a record object. The keyword "record" is a new kind of type declaration in the Java language. A record is a restricted form of a class. It declares its representation, and commits to an API that matches that representation.

A record has a name and a state description. The state description declares the components of the record. Optionally, a record has a body. For example, a record class for a point object having an integer x coordinate and an integer y coordinate may have the record declaration:

record Point(int x, int y) { }

Because records are carriers for their data, a record acquires many standard members automatically. Each record includes a private final field for each component of the state description. Each record also includes a public read accessor method for each component of the state description, with the same name and type as the component. A record includes a public constructor having a signature that is the same as the state description, which initializes each field from the corresponding argument. This public constructor is called the canonical constructor. In other words, the representation of a record is derived mechanically from the state description, as are the protocols for construction, deconstruction, equality, and display. As an example, a constructor for the Point record class shown in the above record declaration may have a canonical constructor having the format:

```
Point (int x, int y) {
    this.x = x;
    this.y = y;
}
```

In embodiments, the record can only be created by invoking a canonical constructor (e.g., the single constructor). That is, because each value of the record is final, there is no opportunity to create a record with fields containing default values and later assign correct values to those fields. Accordingly, when the code:

Point p=new Point(1,2);

is executed, a new point p is instantiated, such that p.x( ) is equal to 1 and p.y( ) is equal to 2. Neither p.x nor p.y can have different values assigned to the fields.

Thus, classes declared using a particular type declaration (e.g., record) are immutable, and thus objects created based on these classes are immutable objects. In some embodiments, classes not declared using the particular type declaration may also be immutable classes, and thus create immutable objects. For example, a class including only immutable fields (e.g., fields declared as final) may be an immutable class.

4. Serialization

An object may include one or more fields. A field is a variable to which a value may be assigned. The key to storing and retrieving the object in a serialized form is representing the state of objects in a way that is sufficient to reconstruct the object. For Java objects, the serialized form must be able to identify the Java class from which the contents of the object were saved and to restore the contents to a new instance. For serializable objects, a data stream includes sufficient information to restore the fields in the stream to a compatible version of the class. The serialization process may be the same for all objects, whether the object is an immutable object or not.

When serializing an object, a data stream is created. The data stream can be represented by an object, such as an ObjectOutputStream object. Data can be written to the data stream by acting on the created object. For example, where the stream is represented by an ObjectOutputStream object, a method writeObject( ) can specify the object to be written to the data stream.

Figure 5:
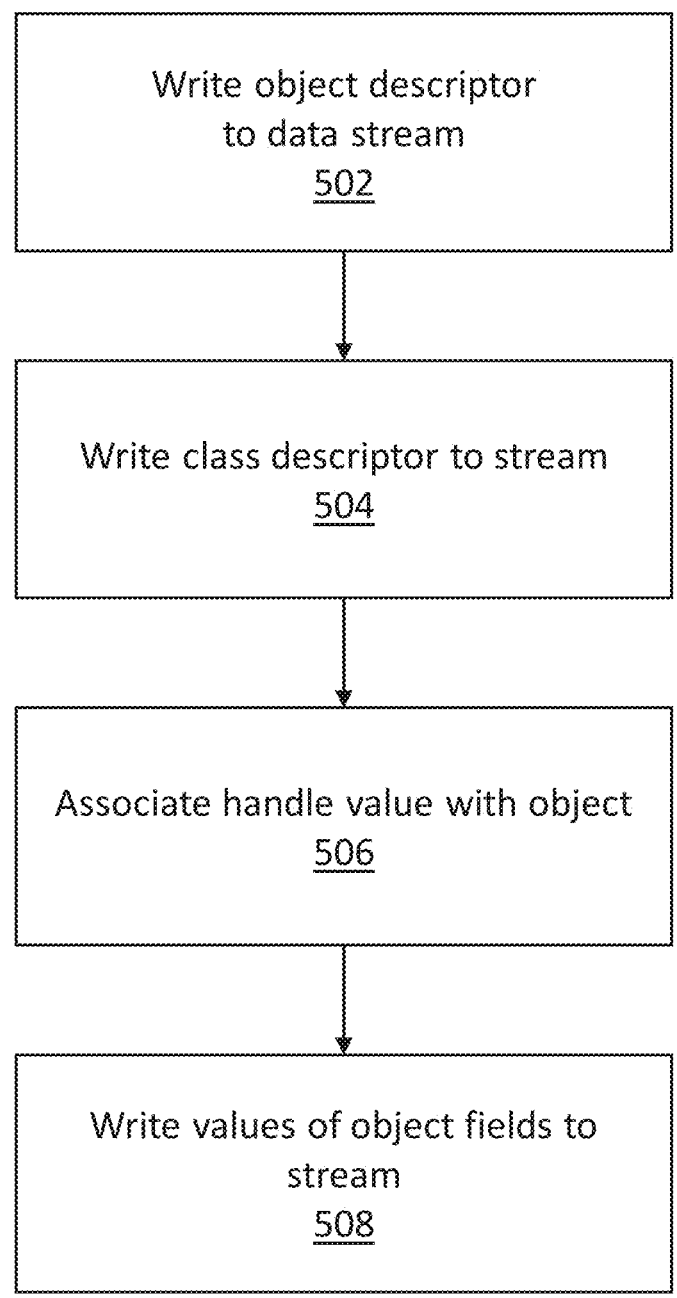
FIG. 5 illustrates a set of operations for serializing an object in accordance with one or more embodiments.

FIG. 5 illustrates a flowchart showing techniques serializing an object. One or more operations illustrated in FIG. 5 may be modified, rearranged, or omitted all together. Accordingly, the particular sequence of operations illustrated in FIG. 5 should not be construed as limiting the scope of one or more embodiments.

In embodiments, an object descriptor can be written to the data stream to indicate the beginning of a new object in the stream (Operation 502). The object descriptor may indicate a particular serialization method, and a corresponding deserialization method associated with the object. The object descriptor may be selected based on at least a class of the object being serialized and an object graph of the object being serialized. In particular, the object descriptor may be selected based on whether the object being serialized is an immutable object (e.g., a record object), whether or not the object graph contains any cycles (e.g., a reference from a field of the object to the object itself, directly or indirectly), and/or system policies. Determining whether the object graph associated with the object can be performed in advance of serialization (e.g., by analyzing the heap) and/or after serialization (e.g., by analyzing the data stream produced by serialization). In embodiments, the object descriptor is selected from among TC_OBJECT, TC_SPLIT_OBJECT, TC_RECORD_OBJECT, and TC_DEFERRED_OBJECT. The object descriptor may be used to convey information to a deserializer, such as when a new handle should be created for the object.

The object descriptor TC_OBJECT may be used to identify an object that is intended to be deserialized using a traditional deserialization algorithm, wherein the handle for the object is generated, memory for the object is allocated, and object field values are assigned together, and functionally occur as a single atomic operation. In particular, the object descriptor TC_OBJECT may be used when an object is a mutable object, and/or when the object graph associated with the object includes one or more cycles.

The object descriptor TC_SPLIT_OBJECT is used to identify an object that is intended to be deserialized using a temporally split deserialization method. That is, the generation of a handle for the object is temporally split from creation of the deserialized object. In particular, the object descriptor TC_SPLIT_OBJECT may be used for objects when the object graph associated with the object does not include any cycles.

The object descriptor TC_RECORD_OBJECT is used to identify an object that is intended to be deserialized using a temporally split deserialization method. That is, the generation of a handle for the object is temporally split from instantiation of the deserialized object. In particular, the object descriptor TC_RECORD_OBJECT may be used for objects when the object is an immutable object and the object graph associated with the object does not include any cycles.

The object descriptor TC_DEFERRED_OBJECT may be used to identify an object that is intended to be deserialized using a secure deserialization algorithm wherein the handle for the object is generated and the object is instantiated together, and functionally occur as a single atomic operation. In particular, the object descriptor TC_DEFERRED_OBJECT may be used when the object is an immutable object, or when the object graph associated with the object does not include any cycles.

A class descriptor may be written to the data stream (Operation 504). The class descriptor may describe various aspects of the class to which the object being written to the stream belongs. As examples, the class descriptor may include information related to class name, superclass, and class fields.

The system can associate a handle value with the object being serialized (Operation 506). The handle value may be a logical monotonically increasing number. In some embodiments, the handle provides an index that can be used to determine an address at which the object is stored. The system can maintain a map of known objects (e.g., a known object table) that includes data associating each assigned handle to a corresponding object. In embodiments, the handle value is not written to the data stream.

The system may additionally write object data to the stream (Operation 508). The object data may include data specifying the field values for each intransient field within the object. In some embodiments, one or more intransient fields within the object being serialized can be a reference to an object. When one intransient field of an object is itself an object, the serialization process can recursively serialize this field as well.

In embodiments, the stream is written to a data file or memory buffer. In other embodiments the stream can be transmitted, such as via a network connection.

In some embodiments, the stream also includes references to an object that was previously serialized. The reference can include an object descriptor value indicating the presence of a reference to an already-serialized object (e.g., a value TC_REFERENCE). The object descriptor value can be followed by a value indicating the handle of the already-serialized object.

5. Deserialization

Deserialization is the process of translating a data stream from a data source (e.g., a file or memory buffer) or from a network connection, into an object. The goal of deserialization is to produce an object that is substantially identical to the object that was serialized.

5.1 Selection of Deserialization Algorithm

Figure 6:
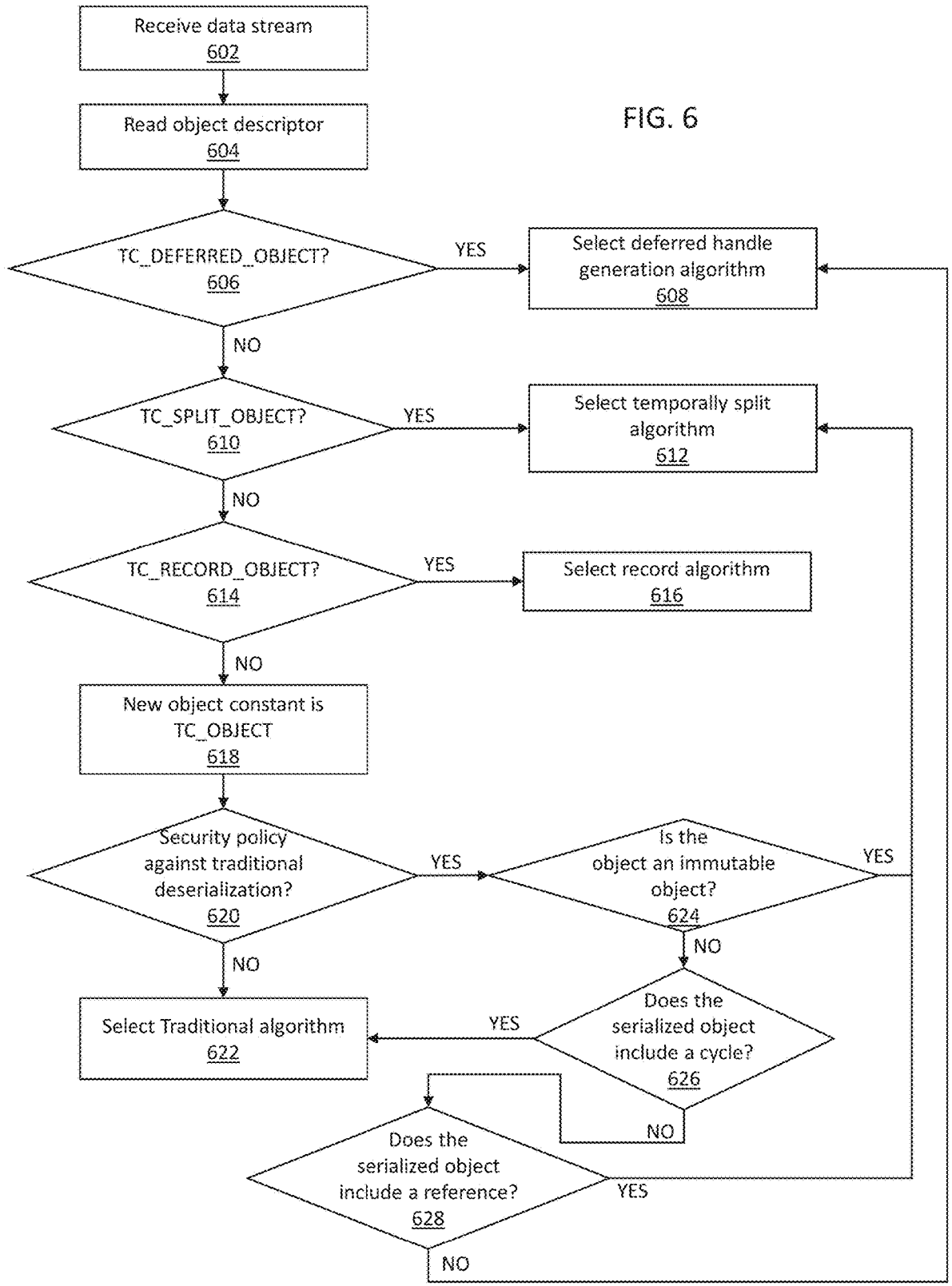
FIG. 6 illustrates a set of operations for selecting a deserialization algorithm in accordance with one or more embodiments.

FIG. 6 illustrates a flowchart showing techniques selecting a deserialization algorithm. One or more operations illustrated in FIG. 6 may be modified, rearranged, or omitted all together. Accordingly, the particular sequence of operations illustrated in FIG. 6 should not be construed as limiting the scope of one or more embodiments.

In embodiments, the system can receive at least a portion of a data stream representing a stream object (Operation 602). In some embodiments, the data stream is received by reading a data file. Alternatively, the data stream can be received via a network connection. The data stream can represent a stream object. In some embodiments the stream object may correspond to a serialized object. The data stream may include an object descriptor, a class descriptor, and stream field values corresponding to the stream object.

The system can read the object descriptor from the data stream (Operation 604). The object descriptor may be read by retrieving data from the data stream. In embodiments, the object descriptor read from the data stream can correspond to one of the plurality of object descriptors used in serializing an object, as discussed above.

The system can determine if the read object descriptor is TC_DEFERRED_OBJECT (Operation 606). If so (YES in Operation 606), the system can select the deferred handle generation deserialization algorithm (Operation 608). Otherwise (NO in Operation 606), the system can determine if the read object descriptor is TC_SPLIT_OBJECT (Operation 610). If so (YES in Operation 610), the system can select the temporally split deserialization algorithm (Operation 612). Otherwise (NO in Operation 610), the system can determine if the read object descriptor is TC_RECORD_OBJECT (Operation 614). If so (YES in Operation 614), the system can select the record deserialization algorithm (Operation 616). If the system determines that the read object descriptor is not one of TC_DEFERRED_OBJECT, TC_SPLIT_OBJECT, or TC_RECORD_OBJECT, the system can determine that the read object descriptor is TC_OBJECT (Operation 618).

The system may determine if there is a system policy regarding deserialization using the traditional deserialization algorithm (Operation 620). For example, a policy may be put in place by a system administrator to avoid using the traditional deserialization algorithm when possible. Such a policy may be useful to avoid the possibility of accessing malformed objects, which can occur during deserialization using the traditional deserialization algorithm. If no such policy exists (NO in Operation 620), the system may select the traditional deserialization algorithm (Operation 622).

If there is a system policy against selection of the traditional deserialization algorithm, the system can determine if the stream object is an immutable object (Operation 624). In some embodiments, the system reads the class descriptor from the data stream to determine whether the stream object is immutable. In some embodiments, the system can determine that the stream object is immutable by analyzing the class declared in the class descriptor. Alternatively, the system may determine that the stream object is immutable when all fields of the object are immutable (e.g., all fields are declared as final). Alternatively, the system can determine that the stream object is immutable by reading the class descriptor to determine if a local class equivalent of the class descriptor is immutable. If the system determines that the stream object is an immutable object (YES in Operation 624), the system may select the temporally split deserialization algorithm (Operation 612) as though the object were serialized using the TC_SPLIT_OBJECT object descriptor.

If the stream object is mutable (NO in Operation 624), the system can determine if an object graph corresponding to the stream object includes any cycles (Operation 626). Stream analysis may be used to determine if a stream object includes a cycle (e.g., a circular reference). The stream analysis may be performed on the data stream (e.g., following serialization and prior to deserialization).

One example of a stream analysis algorithm may include reading data from a data stream as though deserializing the data stream (e.g., using the split deserialization algorithm disclosed below), and maintaining a known object handles map. When a new handle is created, rather than inserting a null value, the system may insert a sentinel value (e.g., RECORD_CREATION_SENTINEL). This sentinel value may be replaced by the record object reference once the object is instantiated, as normal. If the system encounters a TC_REFERENCE object descriptor during the stream analysis, the system may check the value of the target handle. If the target handle value is the sentinel value, the system may determine that the stream object includes a reference to an unconstructed object. This determination is sufficient to detect that the object graph corresponding to the stream object includes a cycle. In some embodiments, when the system determines that the graph corresponding to the object graph corresponding to the stream object includes a cycle, the system may warn the user that a cycle exists in the graph.

If the object is a mutable object and the graph associated with the object does include cycles (YES in Operation 626), the system may select the traditional deserialization algorithm (Operation 622). That is, the system may determine that the traditional deserialization method will best deserialize the stream object. Alternatively (e.g., if the system is prohibited from executing a traditional deserialization algorithm by policy) the system may provide a warning that the graph includes cycles and will not be reproduced correctly, and may select the temporally split deserialization algorithm.

If the system determines that the graph associated with the stream object does not include cycles (NO in Operation 626), the system may analyze the data stream to determine if the stream object includes any TC_REFERENCE object descriptor (Operation 628). This may be determined by reading the data stream as though deserializing the stream object. If the stream object does not include any TC_REFERENCE object descriptors (NO in Operation 628), the system can select the deferred handle generation deserialization algorithm (Operation 608). That is, the system can deserialize the stream object as though the object descriptor were TC_DEFERRED_OBJECT. Alternatively, if the system determines that the stream object includes one or more TC_REFERENCE object descriptors (YES in Operation 628), the system may select the temporally split deserialization algorithm (Operation 612) as though the object were serialized using the TC_SPLIT_OBJECT object descriptor. In particular, when the object graph includes a TC_REFERENCE object descriptor, the system may select a deserialization algorithm that assigns handle values in the same way that handles are generated during the object serialization.

5.2 Object Deserialization

Once a deserialization algorithm is selected, the deserializer system may deserialize the stream object using the selected algorithm.

5.2.1 Traditional Deserialization Algorithm

This algorithm may be similar to the algorithm conventionally used for object deserialization. In embodiments, the algorithm is used in response to a TC_OBJECT object descriptor being read from the data stream. The traditional deserialization algorithm may be useful for deserializing a stream object, particularly when the object graph corresponding to the stream object includes one or more cycles. The format for a stream object may be:

TC_OBJECT classDesc objectdata[ ]

Where TC_OBJECT is the object descriptor indicating a new object in the data stream; classDesc is a class descriptor describing the class including class name, superclass, and class fields; and objectdata[ ] is data representing the field values of the stream object.

Figure 7:
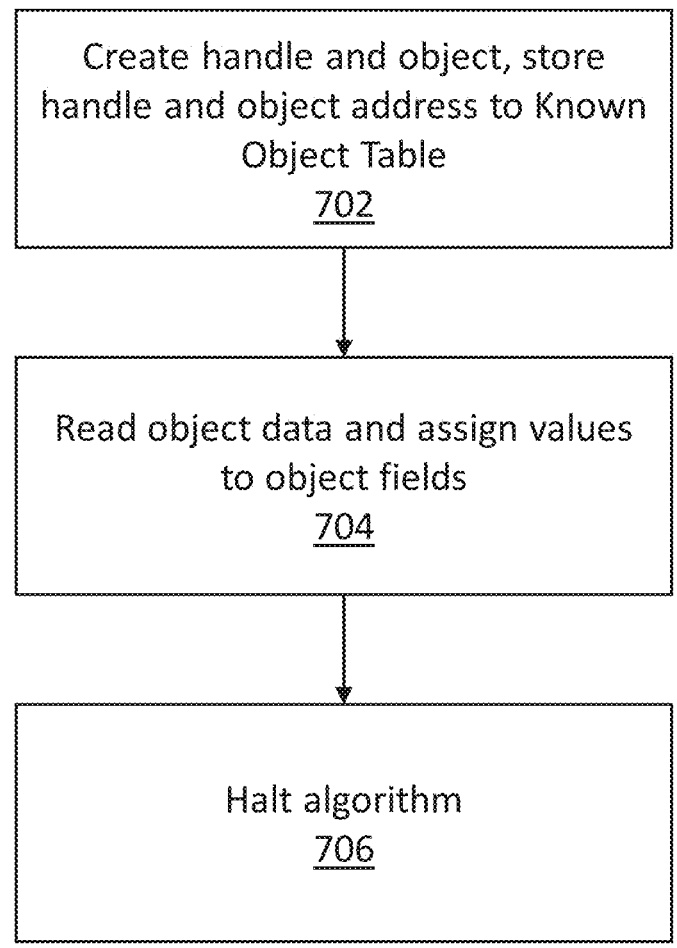
FIG. 7 illustrates a first set of operations for deserializing an object in accordance with one or more embodiments.

FIG. 7 illustrates a flowchart showing techniques for deserializing an object using the traditional deserialization method. One or more operations illustrated in FIG. 7 may be modified, rearranged, or omitted all together. Accordingly, the particular sequence of operations illustrated in FIG. 7 should not be construed as limiting the scope of one or more embodiments.

After reading the object descriptor and class descriptor as part of selecting the deserialization algorithm (See Section 5.1 above), the system may create a handle and store the handle in a Known Object Table, and allocate memory for the deserialized object as an atomic operation (Operation 702).

In some embodiments an initial handle value can be set to an initial value (e.g., 1). The handle values may be a series of monotonically increasing numbers. Accordingly, the handle value of the created handle can be a next available handle value. Additionally, the system may allocate memory for the deserialized object based on the class descriptor. The memory may be allocated without executing any constructor for the object. In embodiments, values for each field in the deserialized object are set to default values. In some embodiments the default values of one or more of the fields are null.

In embodiments, the handle value may be stored in a Known Object Table and the memory address of the memory allocated for the deserialized object may be stored in the Known Object Table in association with the handle value.

Following the storing of the handle value and memory address in the Known Object Table, the system may read the stream field values and assign values to each field of the deserialized object (Operation 704). The values can be stored in the allocated memory, according to the class descriptor. The values can be determined based on the object data (e.g., the stream field values) of the stream object, as read from the data stream representing the stream object.

In particular, object data may contain primitive values and/or an indicator of an object (e.g., an object marker, such as a TC_REFERENCE object marker). For primitive values included in the object data, the value can be read from the data stream and assigned to the corresponding field of the deserialized object (e.g., replacing the default value). For an indication of an object, the deserialization process can recursively deserialize this object as well. In particular, each time the system encounters the object descriptor indicating an object (e.g., an object descriptor TC_REFERENCE or TC_OBJECT), the system can restart the process for the new object.

Once all class fields have been assigned for the deserialized object, the object is complete, and the algorithm may halt (Operation 706).

5.2.2 Temporally Split Deserialization Algorithm

In embodiments, the temporally split deserialization algorithm is used in response to a TC_SPLIT_OBJECT object descriptor being read from the data stream. The "temporally split" phrase of the temporally split deserialization algorithm refers to a split in time between when a handle is added to the Known Object Table and when the object is instantiated. The format for a stream object may be:

TC_SPLIT_OBJECT classDesc objectdata[ ]

Where TC_SPLIT_OBJECT is the object descriptor indicating a new object in the data stream; classDesc is a class descriptor describing the class including class name, superclass, and class fields; and objectdata[ ] is data representing the field values of the stream object.

Figure 8:
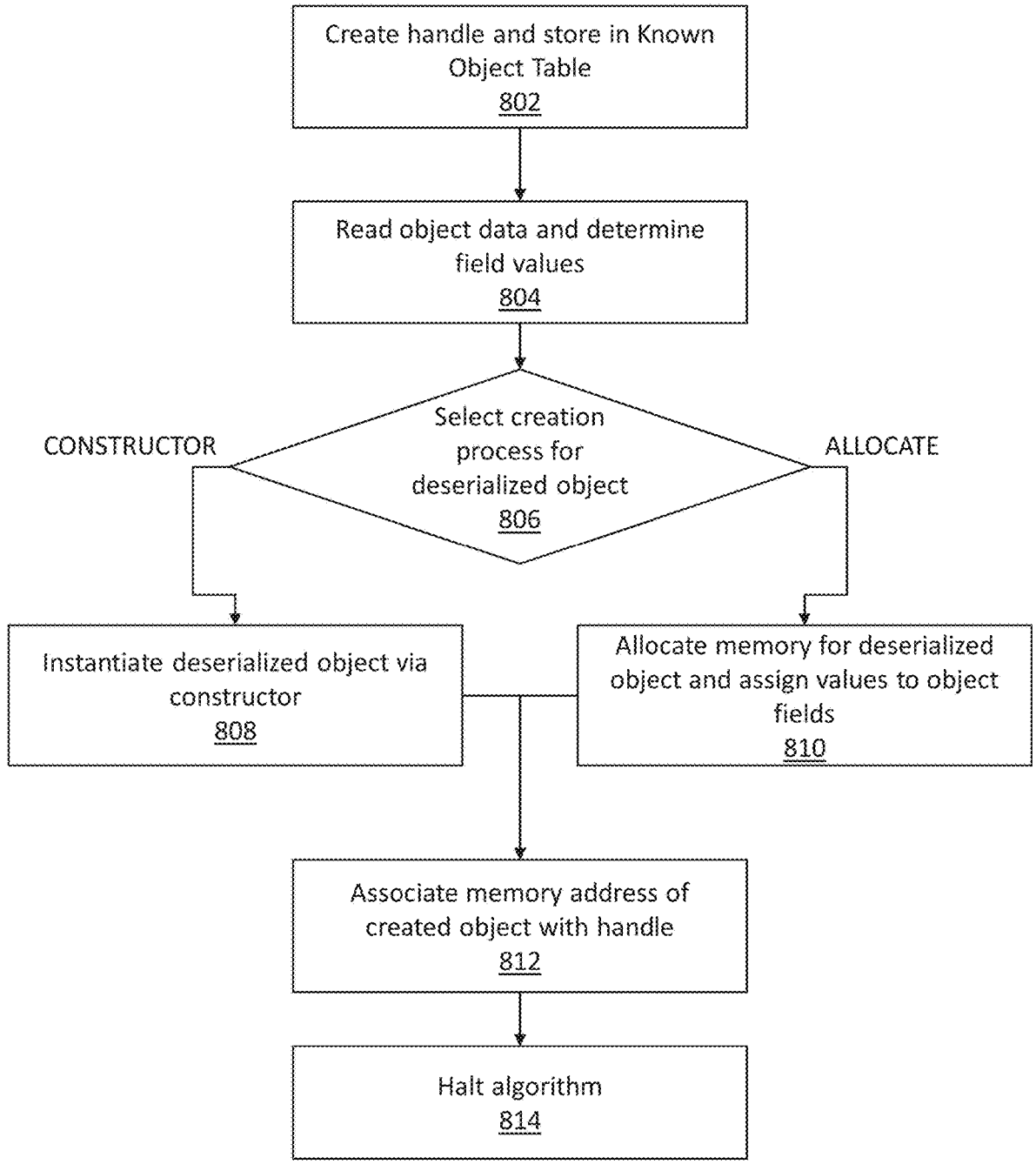
FIG. 8 illustrates a second set of operations for deserializing an object in accordance with one or more embodiments.

FIG. 8 illustrates a flowchart showing techniques for deserializing an object using the temporally split deserialization method. One or more operations illustrated in FIG. 8 may be modified, rearranged, or omitted all together. Accordingly, the particular sequence of operations illustrated in FIG. 8 should not be construed as limiting the scope of one or more embodiments.

After reading the object descriptor and class descriptor as part of selecting the deserialization algorithm (See Section 5.1 above), the system may create a handle and store the handle in a Known Object Table (Operation 802).

In some embodiments an initial handle value can be set to an initial value (e.g., 1). The handle values may be a series of monotonically increasing numbers. Accordingly, the handle value of the created handle may be a next available handle value. The handle value may be stored in a Known Object Table and associated with a value indicating a notional deserialized object that has not yet been instantiated based on a stream object. For example, the handle value may be associated with a value of null or a sentinel value.

The system may read the object data and determine values for each field of the deserialized object (Operation 804). The values can be stored temporarily in working memory. The values can be determined based on the object data of the stream object, as read from the data stream representing the stream object.

In particular, object data may contain primitive values and/or an indicator of an object (e.g., an object marker, such as a TC_REFERENCE object marker). For primitive values included in the object data, the value can be read from the data stream. For an indication of an object, the deserialization process can recursively deserialize this object as well. In particular, each time the system encounters the object descriptor indicating an object (e.g., an object descriptor TC_REFERENCE or TC_SPLIT_OBJECT), the system can restart the process for the new object.

Following reading the stream field values, the system may select a creation technique for the deserialized object (Operation 806). The system may select a creation technique for the deserialized object based on system policies and/or the class descriptor. The creation technique may be selected as one of instantiating the deserialized object using a constructor or allocating memory for the deserialized object.

In response to selecting to create the object via instantiation (CONSTRUCTOR in Operation 806), the system may instantiate the deserialized object (Operation 808). In some embodiments, the system may instantiate the deserialized object by invoking a constructor of the class, as indicated by the class descriptor. In particular, the constructor may be invoked using the stream field values read from the data stream in Operation 804. Invoking the constructor may instantiate the deserialized object with field values corresponding to the stream field values read from the data stream.

Alternatively, in response to selecting to create the object via allocation (ALLOCATE in Operation 806), the system may allocate memory for the deserialized object (Operation 810). The system may allocate memory based on the class descriptor. The memory may be allocated without executing any constructor for the object. In embodiments, values for each field in the deserialized object may be set (e.g., stored within the allocated memory) using the temporarily stored field values.

The system may update the Known Object Table. In particular, the update of the Known Object Table may include updating the value associated with the handle. The update may include associating the memory address at which the deserialized object is stored with the handle in the Known Object Table (Operation 812). In embodiments, the memory address replaces the null value or sentinel value associated with the handle.

Once the system stores the memory address of the object in the Known Object Table, the deserialized object is complete and the algorithm may halt (Operation 814).

5.2.3 Record Deserialization Algorithm

In embodiments, the record deserialization algorithm may be a specialized version of the temporally split deserialization algorithm. The record deserialization algorithm is used in response to a TC_RECORD_OBJECT object descriptor being read from the data stream. The record deserialization algorithm is used solely to deserialize immutable objects (e.g., record objects). The format for a stream object may be:

TC_RECORD_OBJECT classDesc objectdata[ ]

where TC_RECORD_OBJECT is the object descriptor indicating a new object in the data stream; classDesc is a class descriptor describing the class including class name, superclass, and class fields; and objectdata[ ] is data representing the field values of the stream object.

In some embodiments, the system verifies that the stream object is an immutable object prior to executing the record deserialization algorithm. For example, the system may verify that the stream object is an immutable object based on the class descriptor, which may have been read prior to execution of the algorithm for purposes of algorithm selection.

Figure 9:
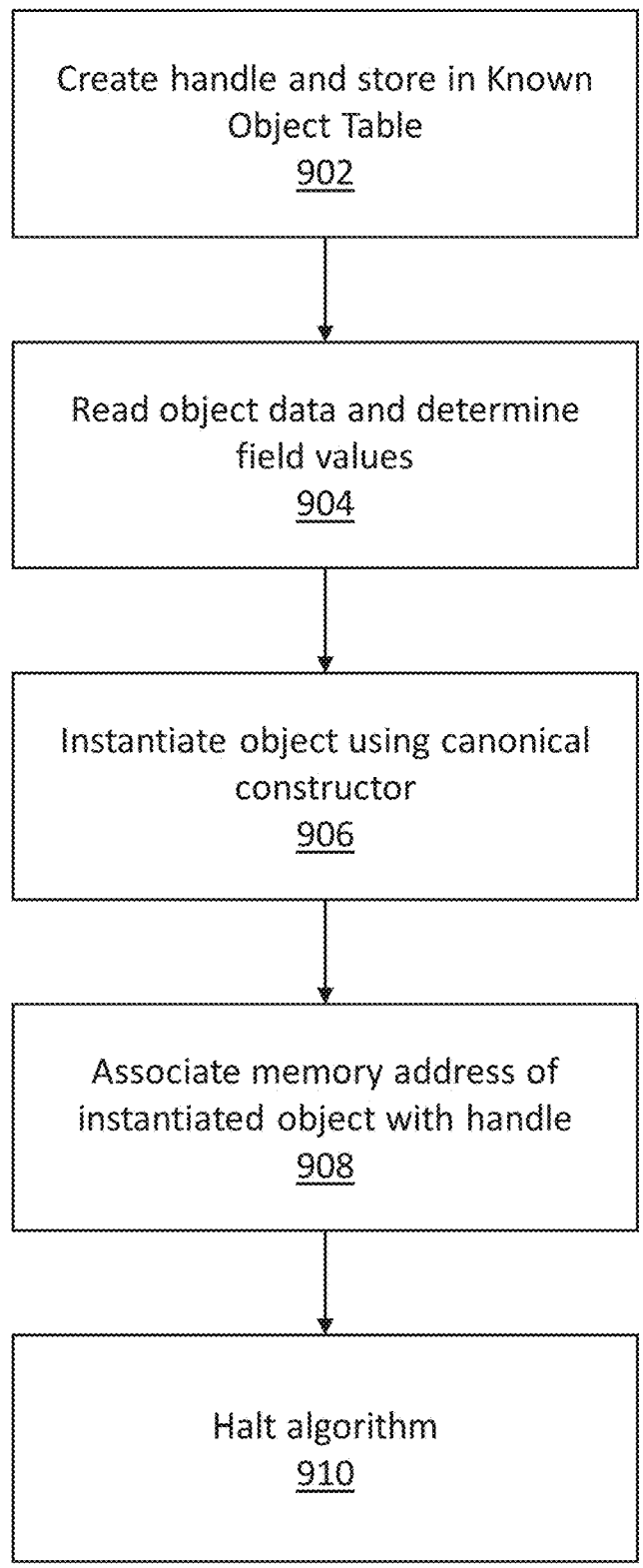
FIG. 9 illustrates a third set of operations for deserializing an object in accordance with one or more embodiments.

FIG. 9 illustrates a flowchart showing techniques for deserializing a stream object using the record deserialization method. One or more operations illustrated in FIG. 9 may be modified, rearranged, or omitted all together. Accordingly, the particular sequence of operations illustrated in FIG. 9 should not be construed as limiting the scope of one or more embodiments.

After reading the object descriptor and class descriptor as part of selecting the deserialization algorithm (See Section 5.1 above), the system may create a handle and store the handle in a Known Object Table (Operation 902).

In some embodiments an initial handle value can be set to an initial value (e.g., 1). The handle values may be a series of monotonically increasing numbers. Accordingly, the handle value of the created handle may be a next available handle value. The handle value may be stored in a Known Object Table and associated with a value indicating a notional deserialized object that has not yet been instantiated based on a stream object. For example, the handle value may be associated with a value of null or a sentinel value.

The system may read the object data and determine values for each field of the deserialized object (Operation 904). The values can be stored temporarily in working memory. The values can be determined based on the object data of the stream object, as read from the data stream representing the stream object.

In particular, object data may contain primitive values and/or an indicator of an object (e.g., an object marker, such as a TC_REFERENCE object marker). For primitive values included in the object data, the value can be read from the data stream. For an indication of an object, deserialization process can recursively deserialize this object as well. In particular, each time the system encounters the object descriptor indicating an object (e.g., an object descriptor TC_REFERENCE or TC_RECORD_OBJECT), the system can restart the process for the new object.

Following reading the field values, the system may instantiate the deserialized object by invoking the canonical constructor (Operation 906). As discussed above, record classes are known to include only a single canonical constructor, which specifies a value for each field of the record object. In particular, the constructor may be invoked using the field values read from the data stream. Invoking the constructor may instantiate the deserialized object with field values corresponding to those read from the data stream.

The system may update the Known object table. In particular, the update of the Known Object Table may include updating the value associated with the handle. The update may include associating the memory address at which the deserialized object is stored with the handle in the Known Object Table (Operation 908). In embodiments, the memory address replaces the null value or sentinel value associated with the handle.

Once the system stores the memory address of the object in the Known Object Table, the deserialized object is complete and the algorithm may halt (Operation 910).

5.2.4 Deferred Handle Generation Deserialization Algorithm

In embodiments, the deferred handle generation algorithm is used in response to a TC_DEFERRED_OBJECT object descriptor being read from the data stream. The traditional deserialization algorithm may be useful for recreating a stream object, particularly when the object graph corresponding to the stream object is free of cycles. The format for a stream object may be:

TC_DEFERRED_OBJECT classDesc conDesc objectdata[ ]

Where TC_DEFERRED_OBJECT is the object descriptor indicating a new object in the data stream; classDesc is a class descriptor describing the class including class name, superclass, and class fields; objectdata[ ] is data representing the field values of the stream object; and conDesc is a constructor descriptor specifying a particular constructor to be used in instantiating the object being deserialized.

Figure 10:
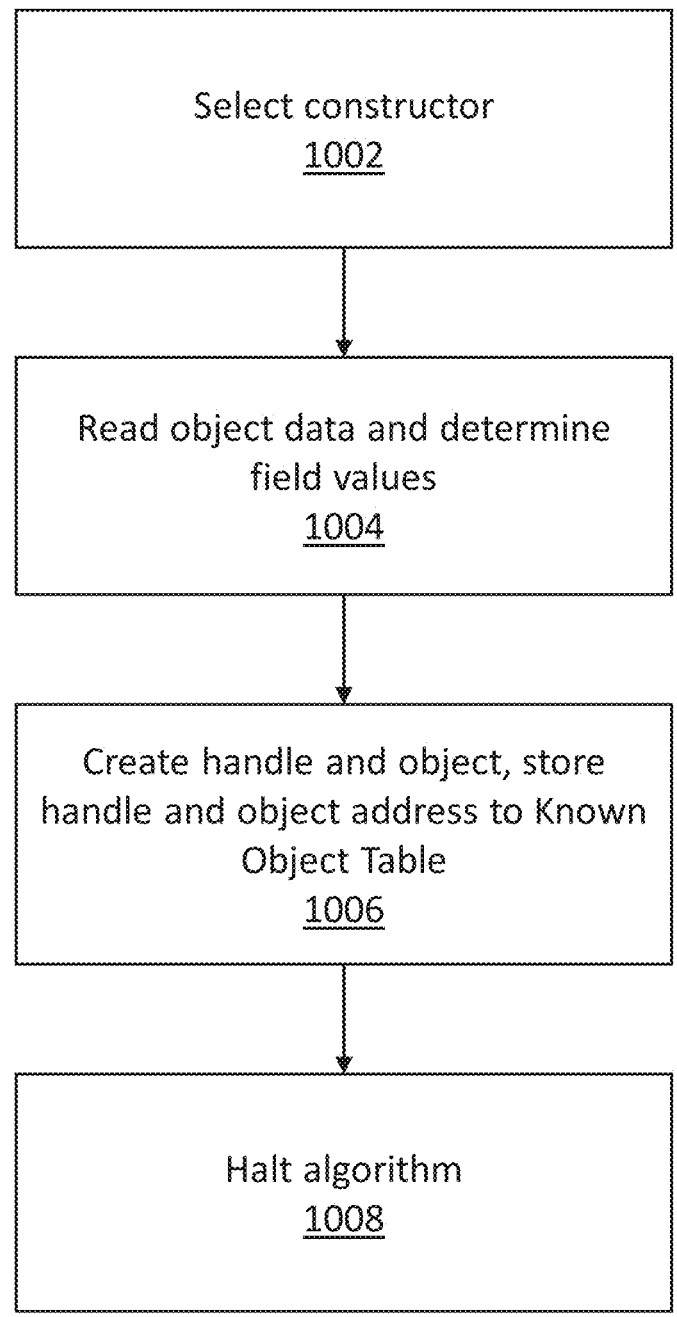
FIG. 10 illustrates a fourth set of operations for deserializing an object in accordance with one or more embodiments.

FIG. 10 illustrates a flowchart showing techniques for deserializing an object using the deferred handle generation deserialization method. One or more operations illustrated in FIG. 10 may be modified, rearranged, or omitted all together. Accordingly, the particular sequence of operations illustrated in FIG. 10 should not be construed as limiting the scope of one or more embodiments.

After reading the object descriptor and class descriptor as part of selecting the deserialization algorithm (See Section 5.1 above), the system may select a constructor for the deserialized object (Operation 1002). The system may read the constructor descriptor from the data stream. In embodiments, the system selects the constructor based at least in part on the read constructor descriptor.

The system may read the object data and determine values for each field of the deserialized object (Operation 1004). The values can be stored temporarily in working memory. The values can be determined based on the object data of the stream object, as read from the data stream representing the stream object.

In particular, object data may contain primitive values and/or an indicator of an object (e.g., an object marker, such as a TC_REFERENCE object marker). For primitive values included in the object data, the value can be read from the data stream. For an indication of an object, the deserialization process can recursively deserialize this object as well. In particular, each time the system encounters the object descriptor indicating an object (e.g., an object descriptor TC_REFERENCE or TC_DEFERRED_OBJECT), the system can restart the process for the new object.

The system may create a handle and store the handle in a Known Object Table, and create the deserialized object as an atomic operation (Operation 1006).

In some embodiments an initial handle value can be set to an initial value (e.g., 1). The handle values may be a series of monotonically increasing numbers. Accordingly, the handle value of the created handle can be a next available handle value.

The system may create the deserialized object by invoking the selected constructor, instantiating the object. In particular, the constructor may be invoked using the field values read from the data stream. Invoking the constructor may instantiate the deserialized object with field values corresponding to those read from the data stream.

In embodiments, the handle value may be stored in a Known Object Table and the memory address of the memory at which the deserialized object is stored may be stored in the Known Object Table in association with the handle value.

Once the system stores the handle and memory address of the deserialized object in the Known Object Table, the object is complete and the algorithm may halt (Operation 1008).

6. Illustrative Examples

The below examples show the difference between deserializing a stream object using various deserialization algorithms. An object can be created and serialized in a variety of coding languages. Objects that do not include cycles can be deserialized using any of the algorithms discussed above.

As an example, a Rectangle object can include two fields (e.g., a point defining a top left corner of the rectangle, and a point defining a bottom right corner of the rectangle); a Point object can include two fields (e.g., an x coordinate and a y coordinate). An object is created and serialized using the following Java-language code:

```
Point p1 = new Point (6, 7);
Point p2 = new Point (8, 9);
Rectangle r = new Rectangle(p1, p2);
ObjectOutputStream oos = new ObjectOutputStream(...);
oos.writeObject(r);
```

Executing the code produces a data stream that includes a stream object which corresponds to the serialized object. The format of the data stream may vary depending on the serialization method used. In particular, the object descriptor may vary.

6.1 Deserializing Using Traditional Deserialization Algorithm

Initially, the traditional deserialization algorithm is described. In particular, given the code shown in Section 6, the Rectangle and Point classes can be defined as follows:

```
class Rectangle implements java.io.Serializable {
Point topLeft;
Point bottomRight;
}
class Point implements java.io.Serializable {
int x;
int y;
}
```

Serializing the code can produce a data stream formatted as:

```
TC_OBJECT <Rectangle class descriptor>
    TC_OBJECT <Point class descriptor>
        6
        7
    TC_OBJECT <Point class descriptor>
        8
        9
```

The system may select the traditional deserialization algorithm based on one or more of: the use of the TC_OBJECT object descriptor and the fact that the Rectangle and Point objects are mutable objects.

Figure 11A:
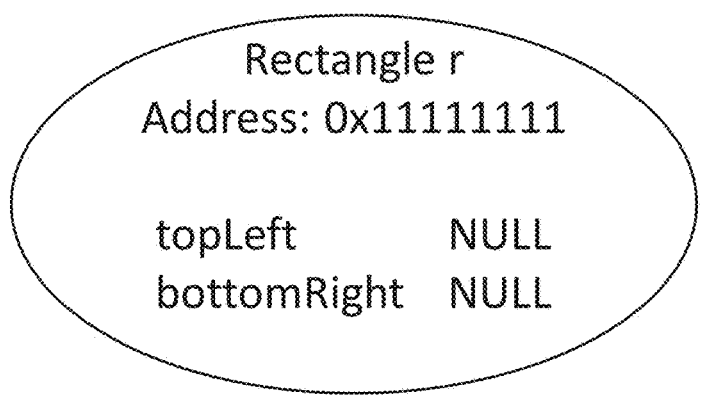
FIGS. 11A-11F illustrate example system states during a first deserialization process, in accordance with one or more embodiments.
Figure 11A:
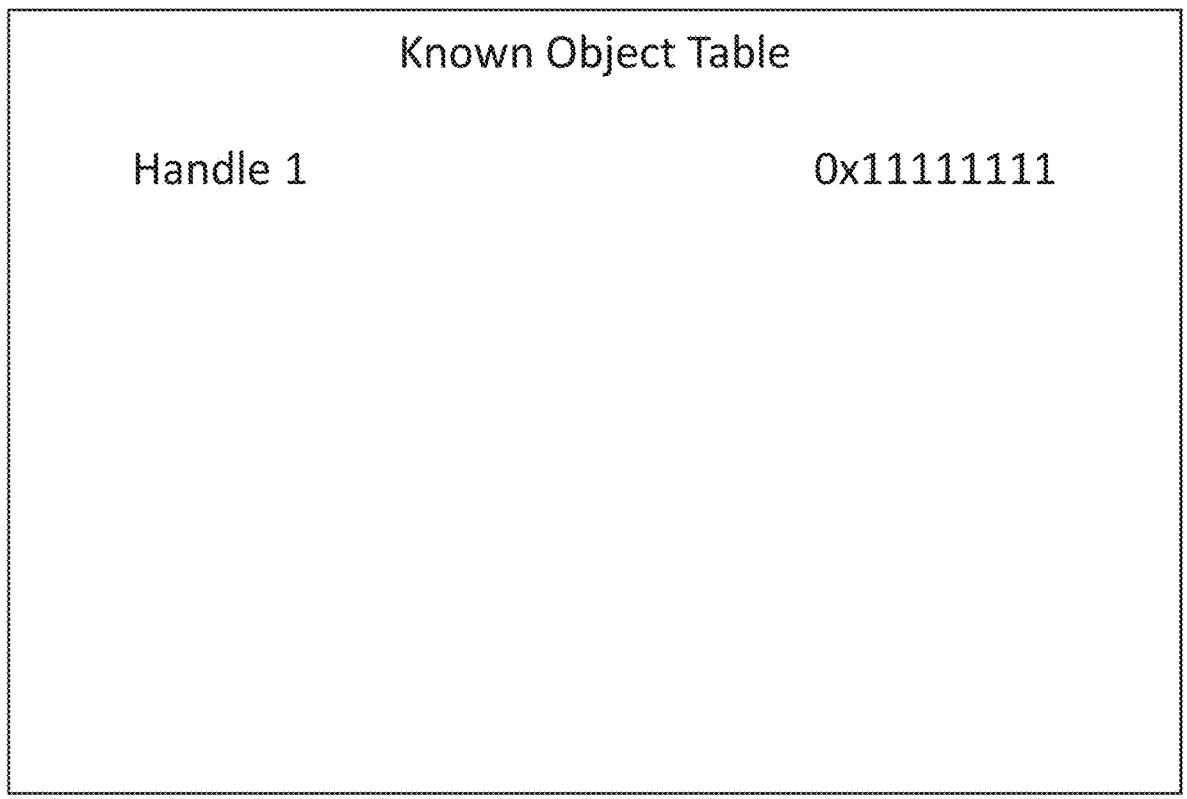

To deserialize the stream object, the system reads the data stream (e.g., from a file or memory buffer, or from a network interface) and follows the process laid out in Section 5.2.1 above. The system can read the first TC_OBJECT object descriptor and the <Rectangle class descriptor>, and creates a first handle (e.g., handle 1) in the Known Object Table. The system allocates memory for the Rectangle object, loads default values for each field of the object, and associates the handle with the memory address of the object. The state of the system at this point is shown in FIG. 11A.

Figure 11B:
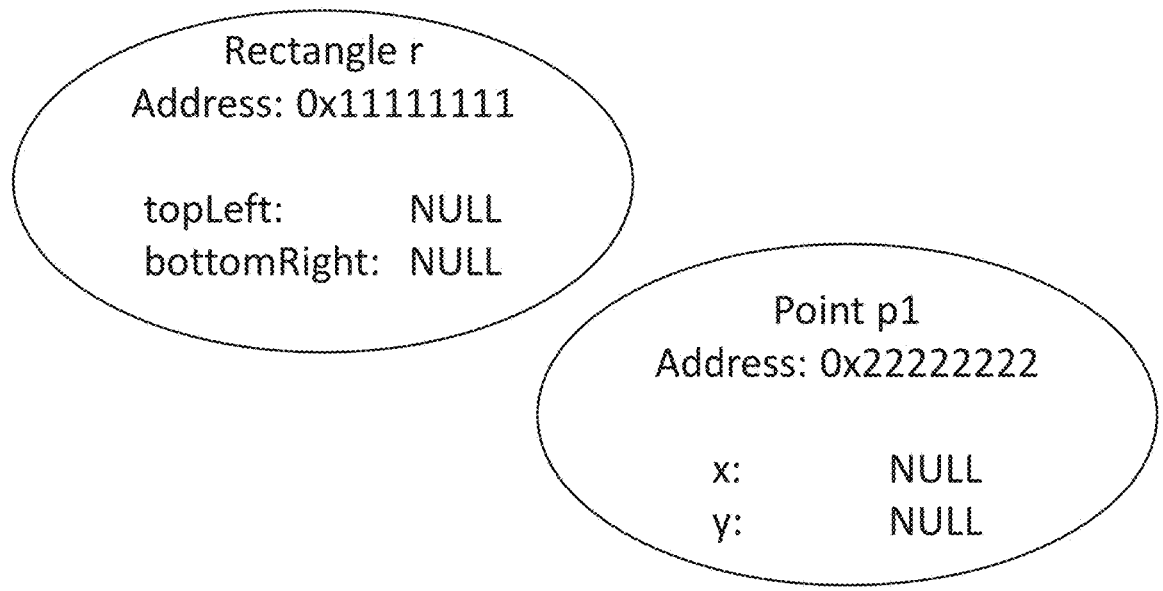

The system then reads the next line, which includes a new TC_OBJECT object descriptor and the <Point class descriptor>. Accordingly, the system creates a next handle (e.g., handle 2) in the Known Object Table, allocates memory for the Point object, loads default values for each field of the object, and associates the handle with the memory address of the object. The state of the system at this point is shown in FIG. 11B.

Figure 11C:
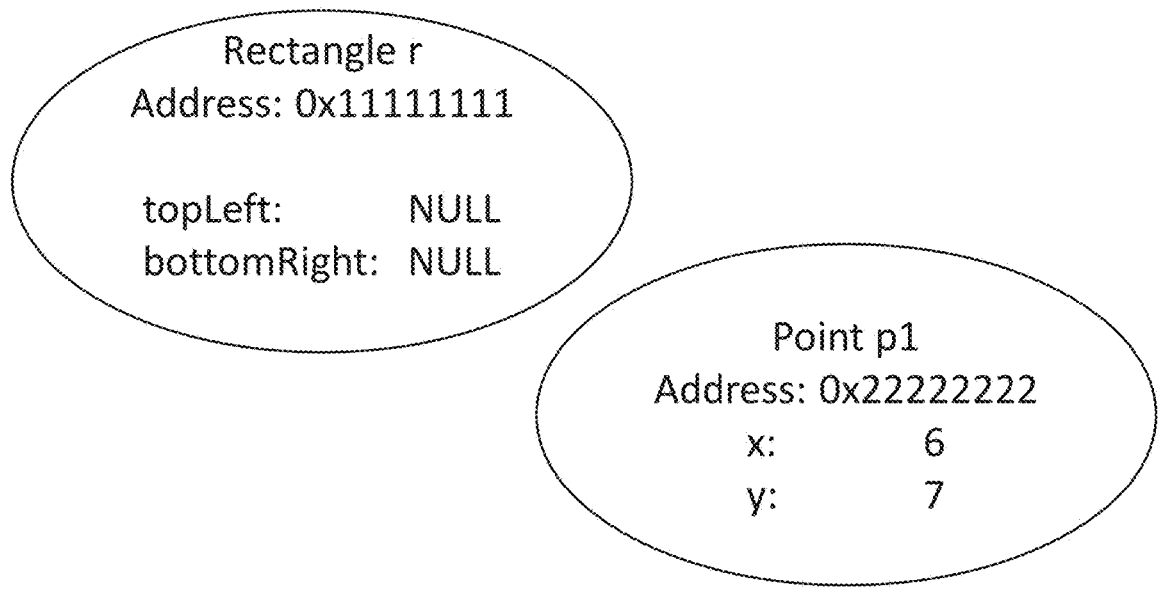

The system then reads the values 6 and 7 as data to fill the fields of the Point object. The system can place these values into the Point object, as shown in FIG. 11C. In particular, the value 6 is placed into the x field and the value 7 is placed into the y field.

Figure 11D:
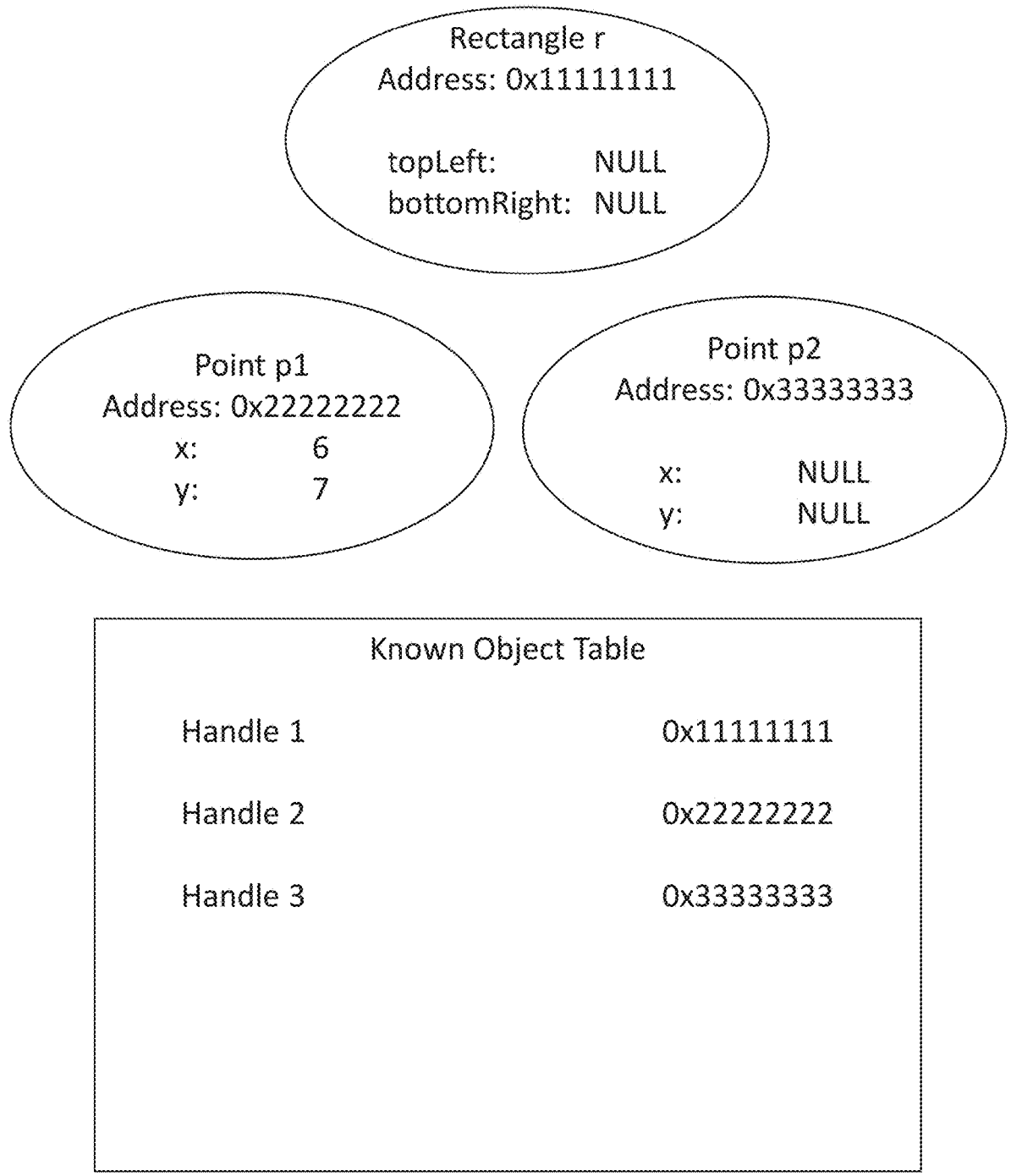

The system then reads the next line, which includes a new TC_OBJECT object descriptor and <Point class descriptor>. Accordingly, the system creates a next handle (e.g., handle 3) in the Known Object Table, allocates memory for a second Point object, loads default values for each field of the object, and associates the handle with the memory address of the object. The state of the system at this point is shown in FIG. 11D.

Figure 11E:
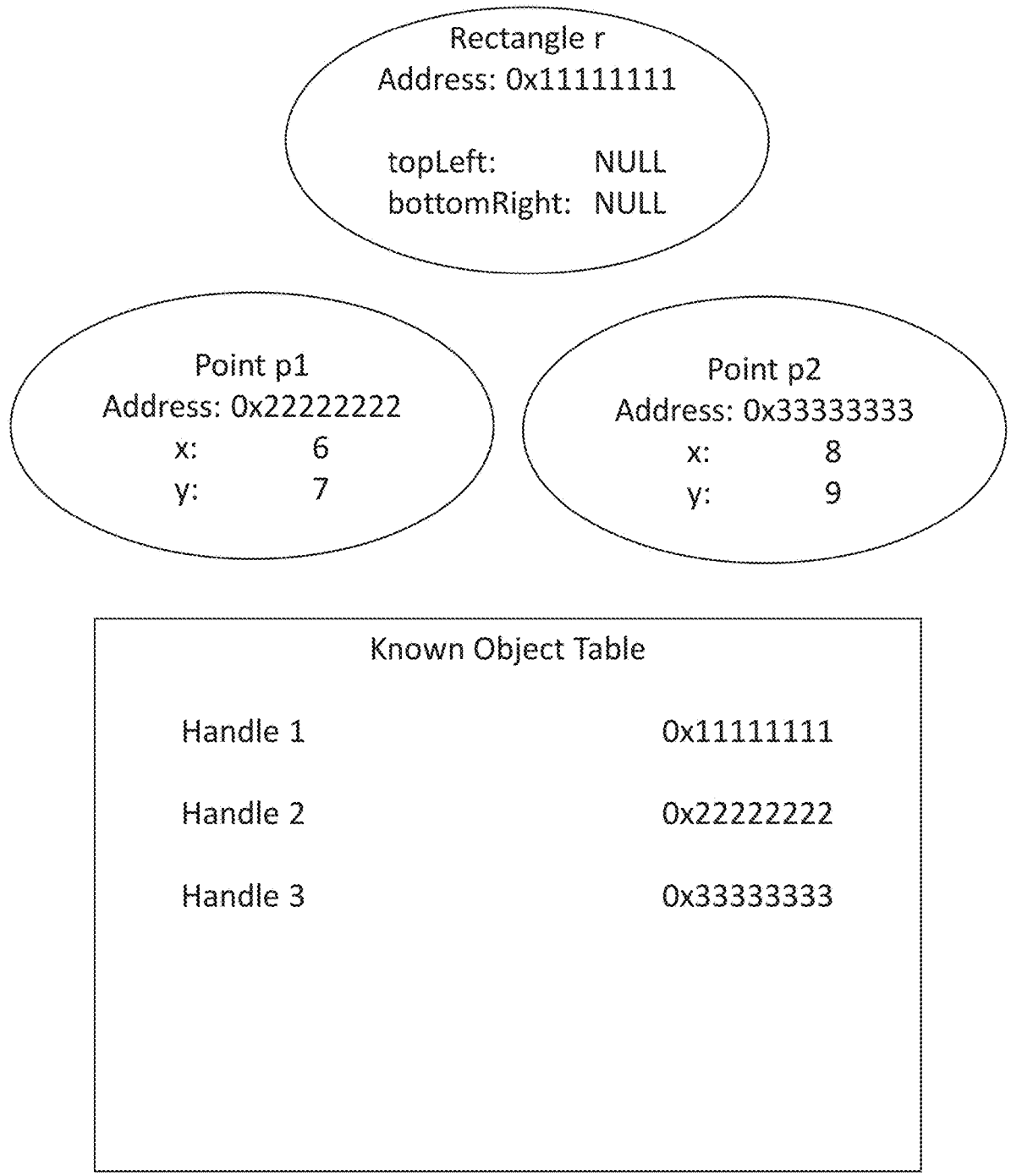

The system then reads the values 8 and 9 as data to fill the fields of the second Point object. The system can place these values into the Point object, as shown in FIG. 11E.

Figure 11F:
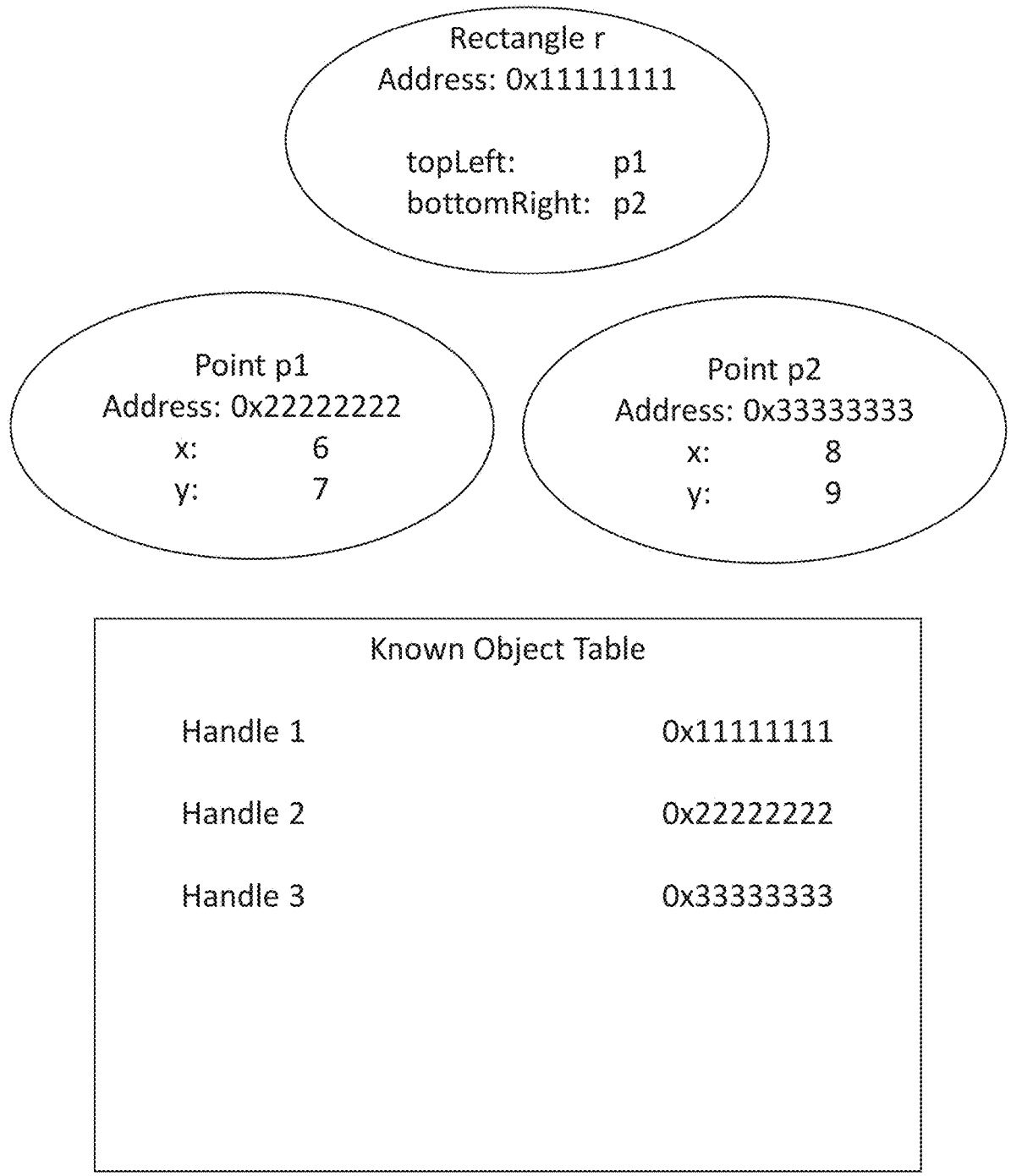

Following assigning the deserialized values to the second Point, the system recognizes that both fields for the Rectangle object are complete and assigns the values to the fields of the rectangle object, as shown in FIG. 11F. At this point, the Rectangle object is completely deserialized. The state of the rectangle object is fully reproduced.

6.2 Deserializing Using Temporally Split Deserialization Algorithm

Deserialization using the temporally split deserialization algorithm is described. In particular, given the code shown in Section 6, the Rectangle and Point classes can be defined as follows:

```
class Rectangle implements java.io.Serializable {
Point topLeft;
Point bottomRight;
}
class Point implements java.io.Serializable {
int x;
int y;
}
```

Serializing the code can produce a data stream formatted as:

```
TC_SPLIT_OBJECT <Rectangle class descriptor>
    TC_SPLIT_OBJECT <Point class descriptor>
        6
        7
    TC_SPLIT_OBJECT <Point class descriptor>
        8
        9
```

The system may select the temporally split deserialization algorithm based on one or more of: the use of the TC_SPLIT_OBJECT object descriptor and/or the lack of cycles in the object graph.

Figure 12A:
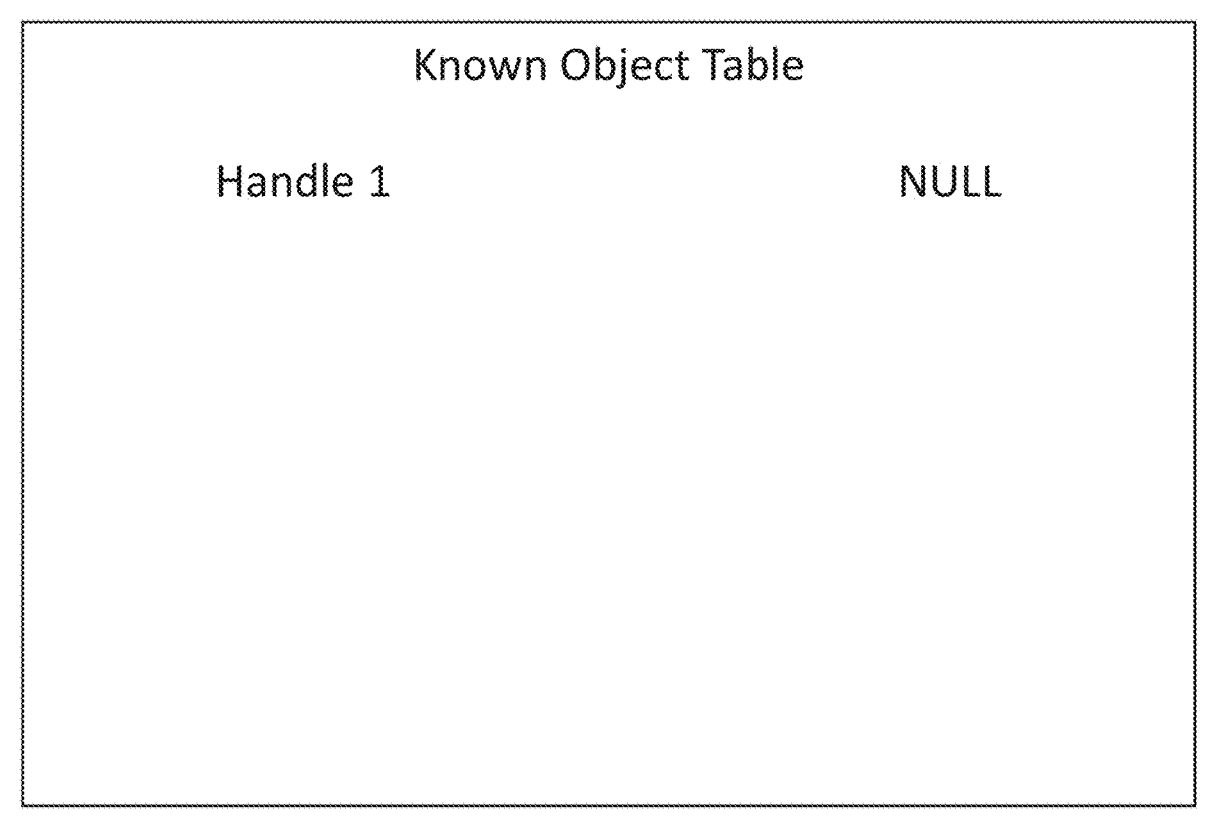

To deserialize the stream object, the system reads the data stream (e.g., from a file or memory buffer, or from a network interface) and follows the process laid out above. The system can read the first TC_SPLIT_OBJECT object descriptor and the <Rectangle class descriptor> and creates a first handle (e.g., handle 1) in the Known Object Table. The system associates the handle with the value null. The state of the system at this point is shown in FIG. 12A.

The system then reads the next line, which includes a new TC_SPLIT_OBJECT object descriptor and the <Point class descriptor>. Accordingly, the system creates a next handle (e.g., handle 2) in the Known Object Table and associates the handle with the value null. The state of the system at this point is shown in FIG. 12B.

Figure 12C:
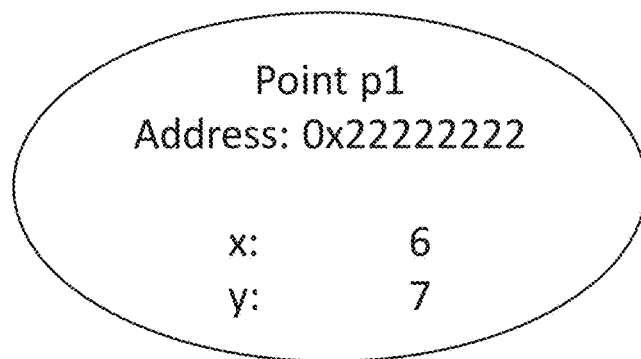
Figure 12C:
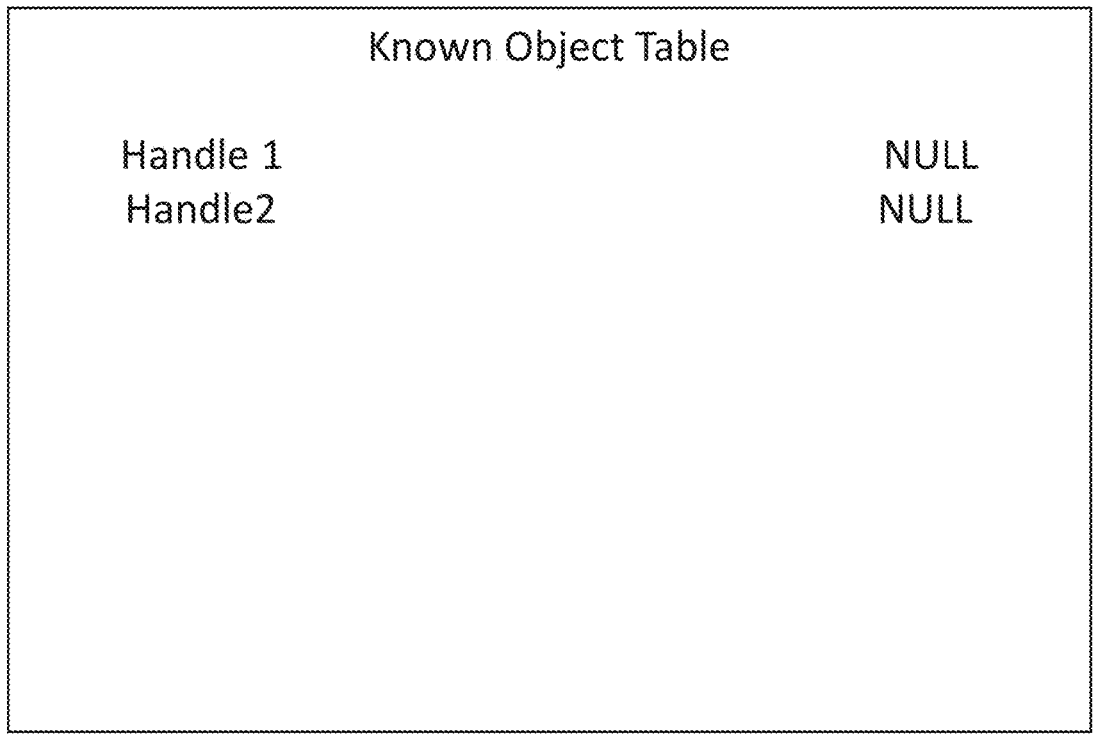

The system then reads the values 6 and 7 as data for the fields of the Point object. The system can allocate memory for the Point object and place the values into the corresponding object fields, as shown in FIG. 12C. In particular, the value 6 is placed into the x field and the value 7 is placed into the y field.

Figure 12D:
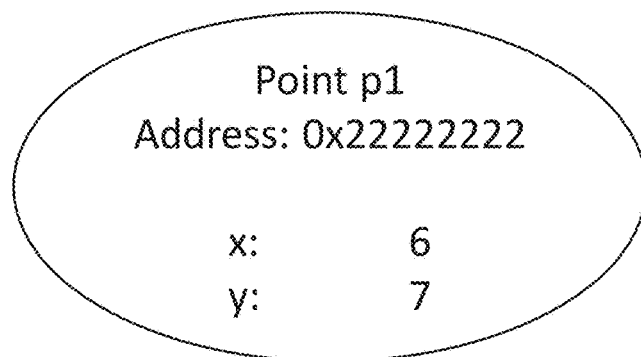
Figure 12D:
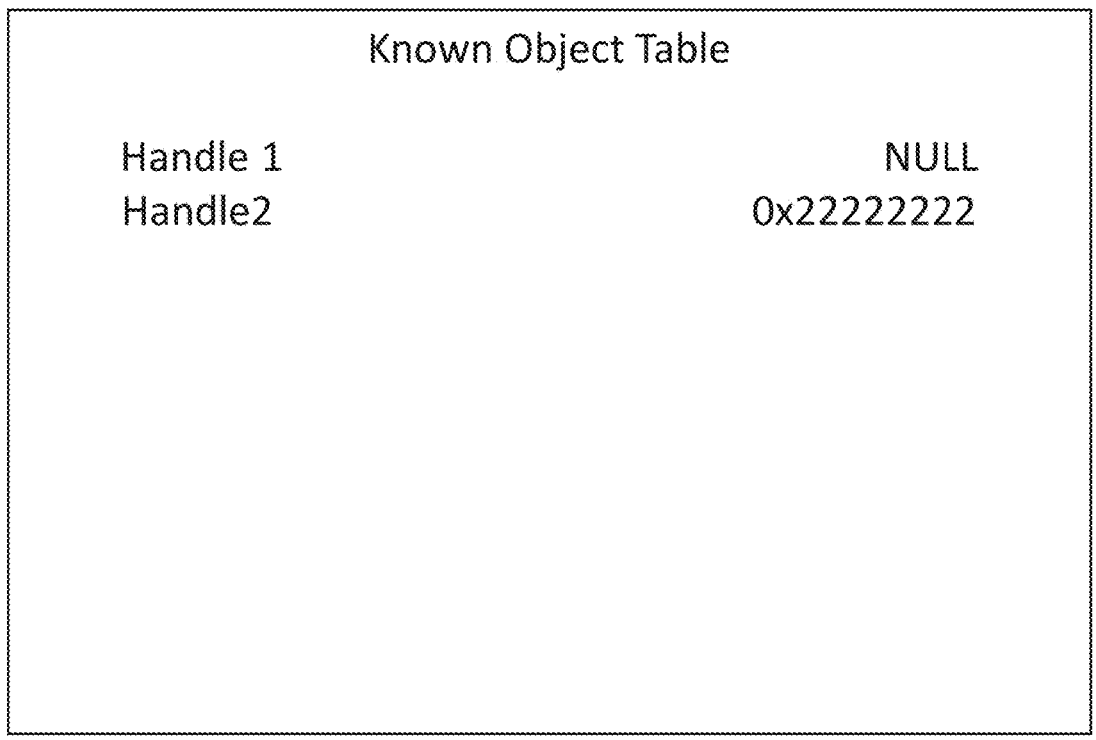

Following the creation of the object, the system can associate the handle with the memory address of the object. In particular, the system can update the Known Object Table to include the memory address of the object in association with the handle, as shown in FIG. 12D.

Figure 12E:
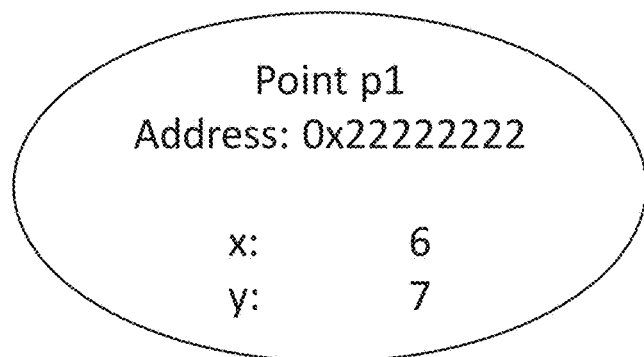

The system then reads the next line, which includes a new TC_SPLIT_OBJECT object descriptor and the <Point class descriptor>. Accordingly, the system creates a next handle (e.g., handle 3) in the Known Object Table and associates the handle with the value null. The state of the system at this point is shown in FIG. 12E.

Figure 12F:
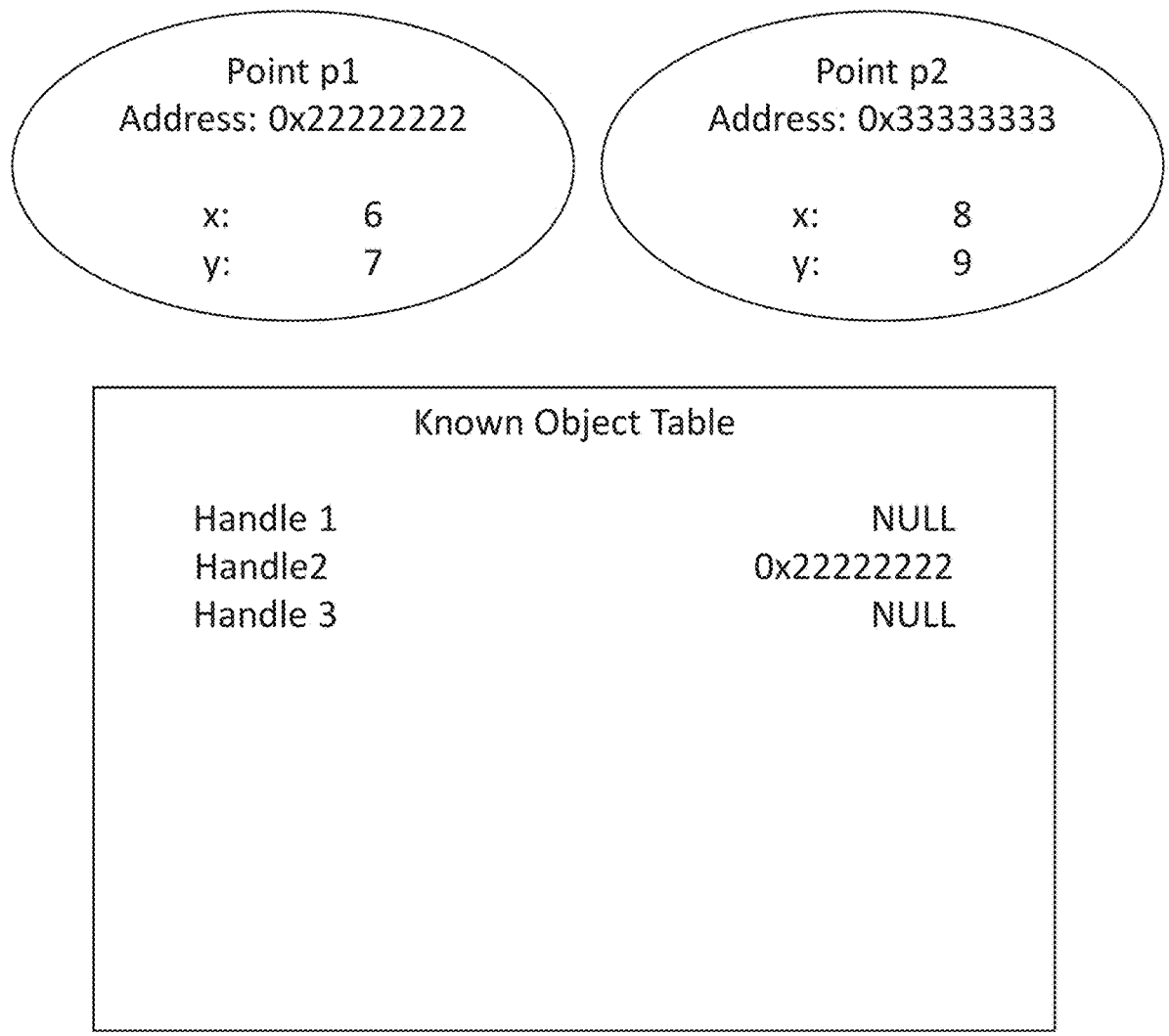

The system then reads the values 8 and 9 as data for the fields of the Point object. The system can allocate memory for the Point object and place the values into the corresponding object fields, as shown in FIG. 12F. In particular, the value 8 is placed into the x field and the value 9 is placed into the y field.

Figure 12G:
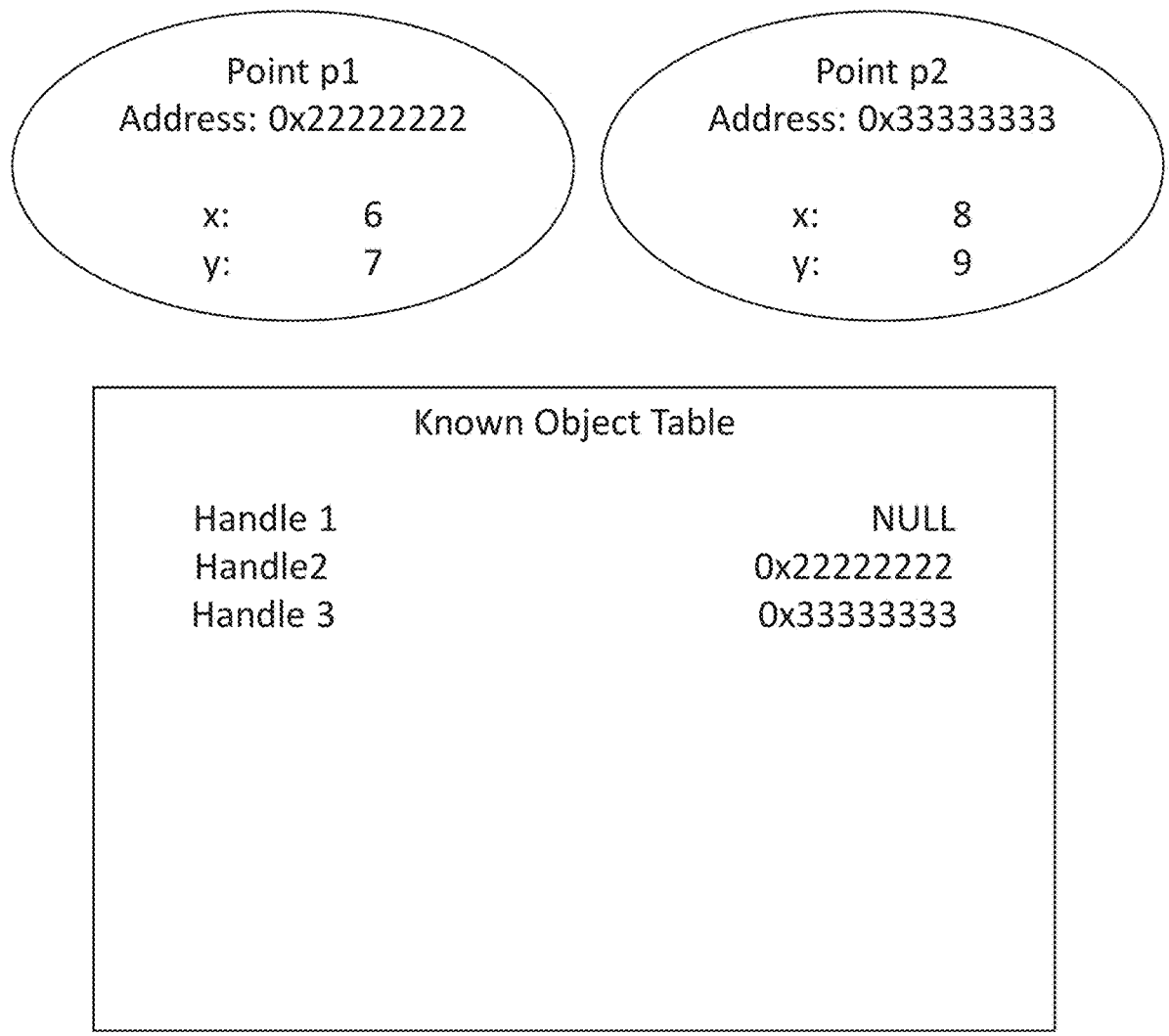

Following the instantiation of the object, the system can associate the handle with the memory address of the object. In particular, the system can update the Known Object Table to include the memory address of the object in association with the handle, as shown in FIG. 12G.

Figure 12H:
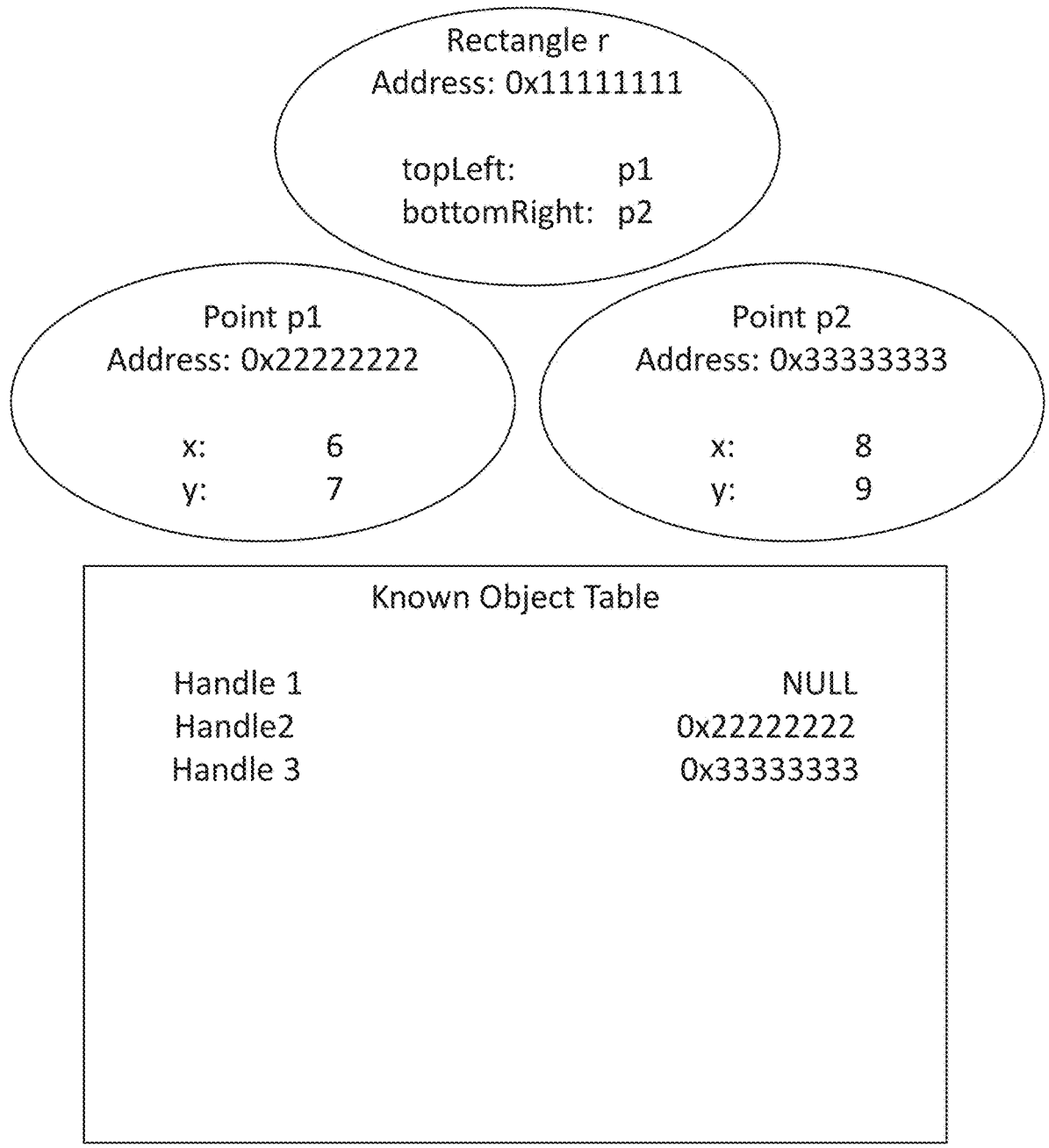
Figure 12J:
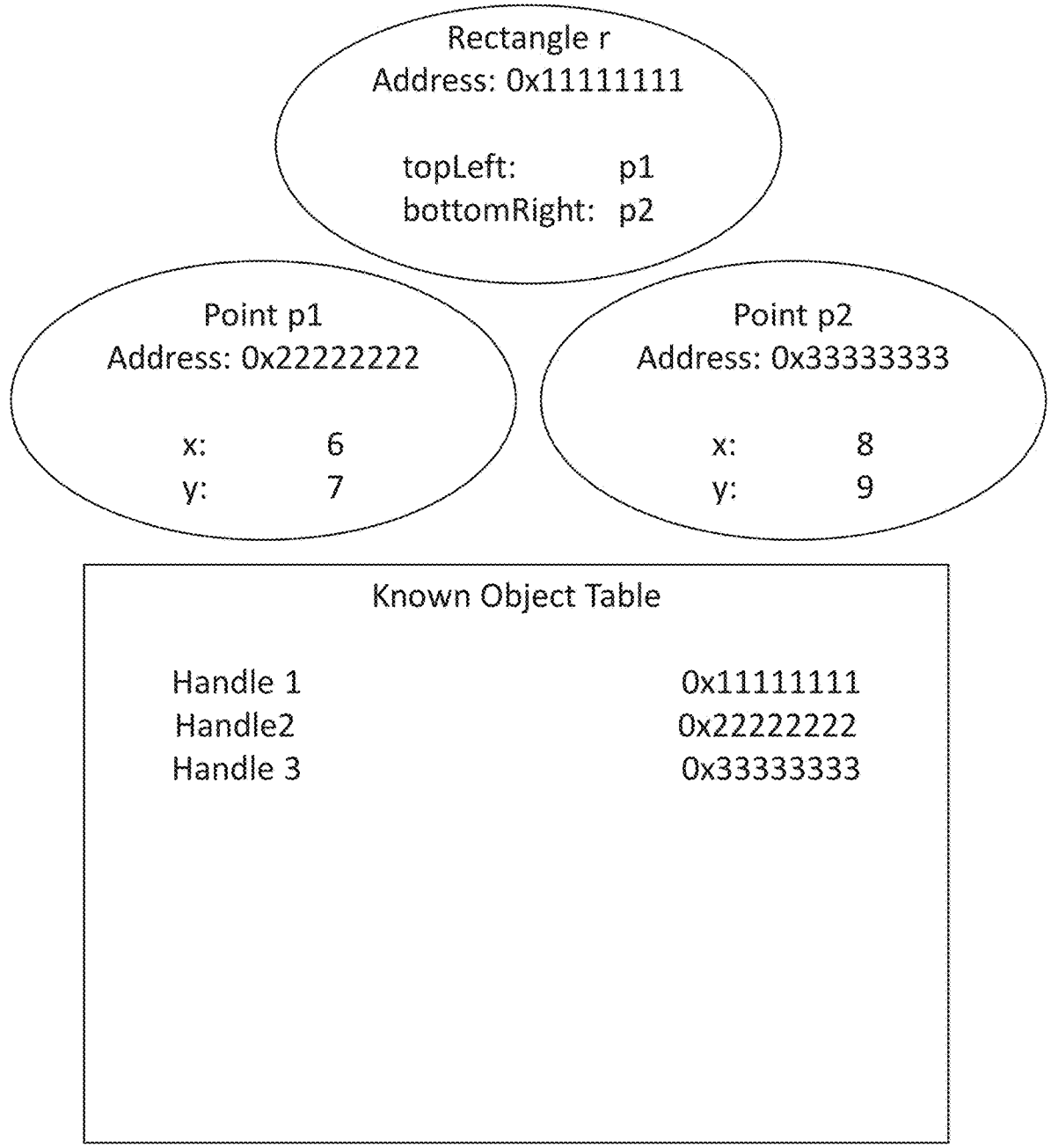

Following assigning the deserialized values to the second Point object, the system recognizes that it has read both fields for the Rectangle object. Accordingly, the system allocates memory for the Rectangle object and places the two Point objects into the object as field values, as shown in FIG. 12H. Finally, the system associates the handle for the Rectangle object (e.g., handle 1) with the address of the Rectangle object, as shown in FIG. 12J. At this point, the Rectangle object is completely deserialized.

6.3 Deserializing Using Record Deserialization Algorithm

Deserialization using the temporally split deserialization algorithm is described. In particular, given the code shown in Section 6, the Rectangle and Point classes can be defined as follows:

```
record Rectangle (Point topLeft, Point bottomRight)
implements java.io.Serializable { }
    record Point (int x, int y) implements java.io.Serializable
{ }
```

Serializing the code can produce a data stream formatted as:

```
TC_RECORD_OBJECT <Rectangle class descriptor>
    TC_RECORD_OBJECT <Point class descriptor>
    6
    7
    TC_RECORD_OBJECT <Point class descriptor>
    8
    9
```

The system may select the record deserialization algorithm based on one or more of: the use of the TC_RECORD_OBJECT object descriptor, the fact that the stream object corresponds to an immutable object (e.g., a record object), and/or the lack of cycles in the object graph.

Deserialization using the record deserialization algorithm tracks the steps of deserialization using the temporally split algorithm. However, instantiating the objects according to the record deserialization algorithm includes invoking the canonical constructor of the record class to instantiate the object using the values read from the object data.

6.4 Deserializing Using Deferred Handle Generation Deserialization Algorithm

Deserialization using the deferred handle generation deserialization algorithm is described. In particular, given the code shown in Section 6, the Rectangle and Point classes can be defined as follows:

```
class Rectangle (Point topLeft, Point bottomRight)
implements java.io.Serializable { }
    class Point (int x, int y) implements java.io.Serializable
{ }
```

Serializing the code can produce a data stream formatted as:

```
TC_DEFERRED_OBJECT <Rectangle class descriptor <Rectangle
constructor descriptor>
    TC_DEFERRED_OBJECT <Point class descriptor> <Point
constructor descriptor>
    6
    7
    TC_DEFERRED_OBJECT <Point class descriptor> <Point
constructor descriptor>
    8
    9
```

The system may select the record deserialization algorithm based on one or more of: the use of the TC_DEFERRED_OBJECT object descriptor and/or the lack of cycles in the object graph.

To deserialize the stream object, the system reads the data stream (e.g., from a file or memory buffer, or from a network interface) and follows the process laid out above. The system can read the first TC_DEFERRED_OBJECT object descriptor, the <Rectangle class descriptor>, and the <Rectangle constructor descriptor>. Based on the class descriptor and the constructor descriptor, the system may select a constructor for use in instantiating the Rectangle object.

The system then reads the next line, which includes a new TC_DEFERRED_OBJECT object descriptor, the <Point class descriptor>, and the <Point constructor descriptor>. Based on the class descriptor and the constructor descriptor, the system may select a constructor for use in instantiating the Point object.

Figure 13A:
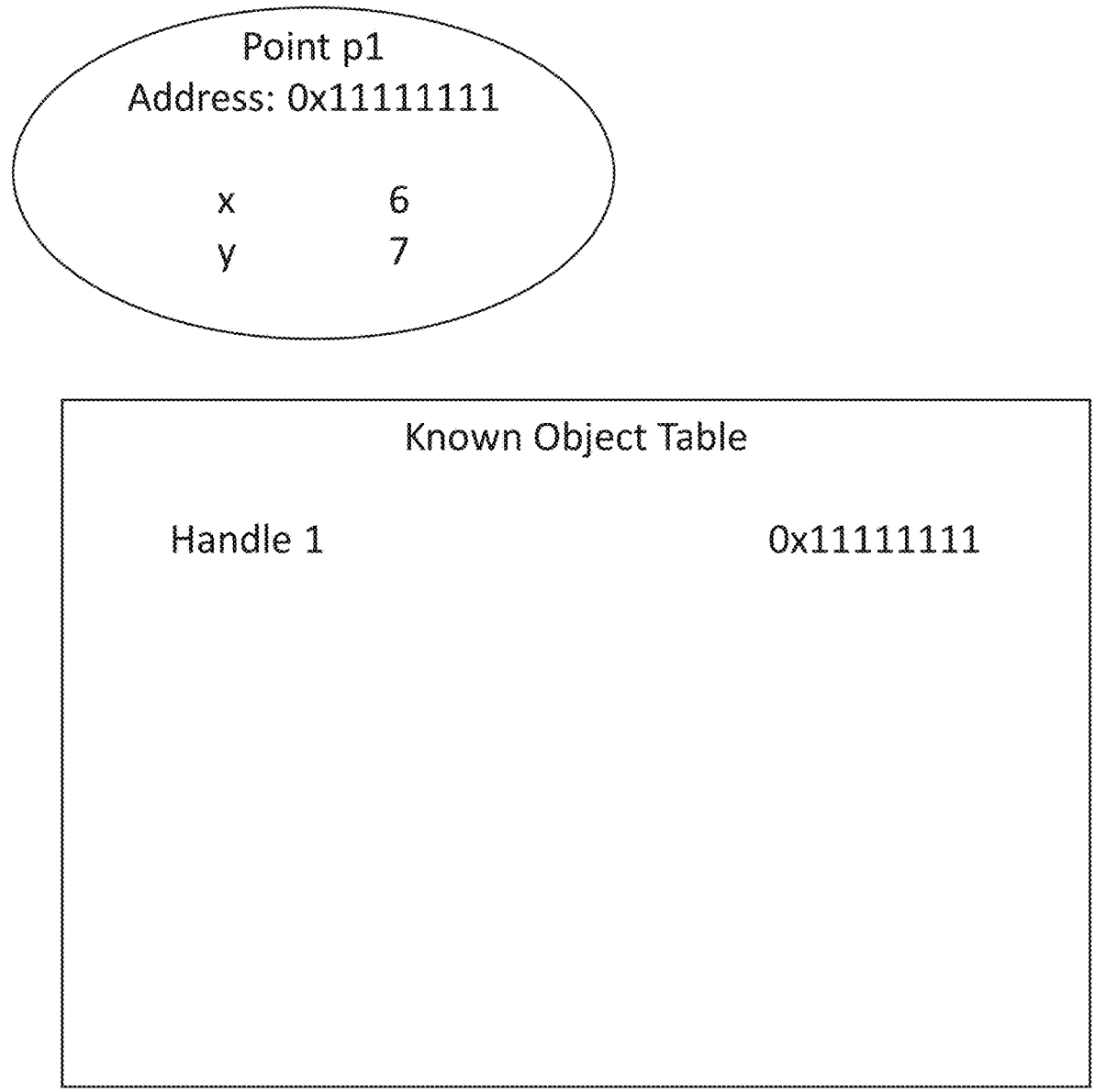
FIGS. 13A-13C illustrate example system states during a third deserialization process, in accordance with one or more embodiments.

The system then reads the values 6 and 7 as data for the fields of the Point object. The system may recognize that it has read all field values for the Point object, and instantiate the Point object by invoking the selected constructor using the read field values. In particular, the constructor can instantiate a Point object p1 having the value 6 in the x field and the value 7 in the y field. As part of an atomic operation, the system also creates a handle (e.g., handle 1) in the Known Object Table and associates the handle with the address of the object, as shown in FIG. 13A.

The system then reads the next line, which includes a new TC_DEFERRED_OBJECT object descriptor, the <Point class descriptor>, and the <Point constructor descriptor>. Based on the class descriptor and the constructor descriptor, the system may select a constructor for use in instantiating the Point object.

Figure 13B:
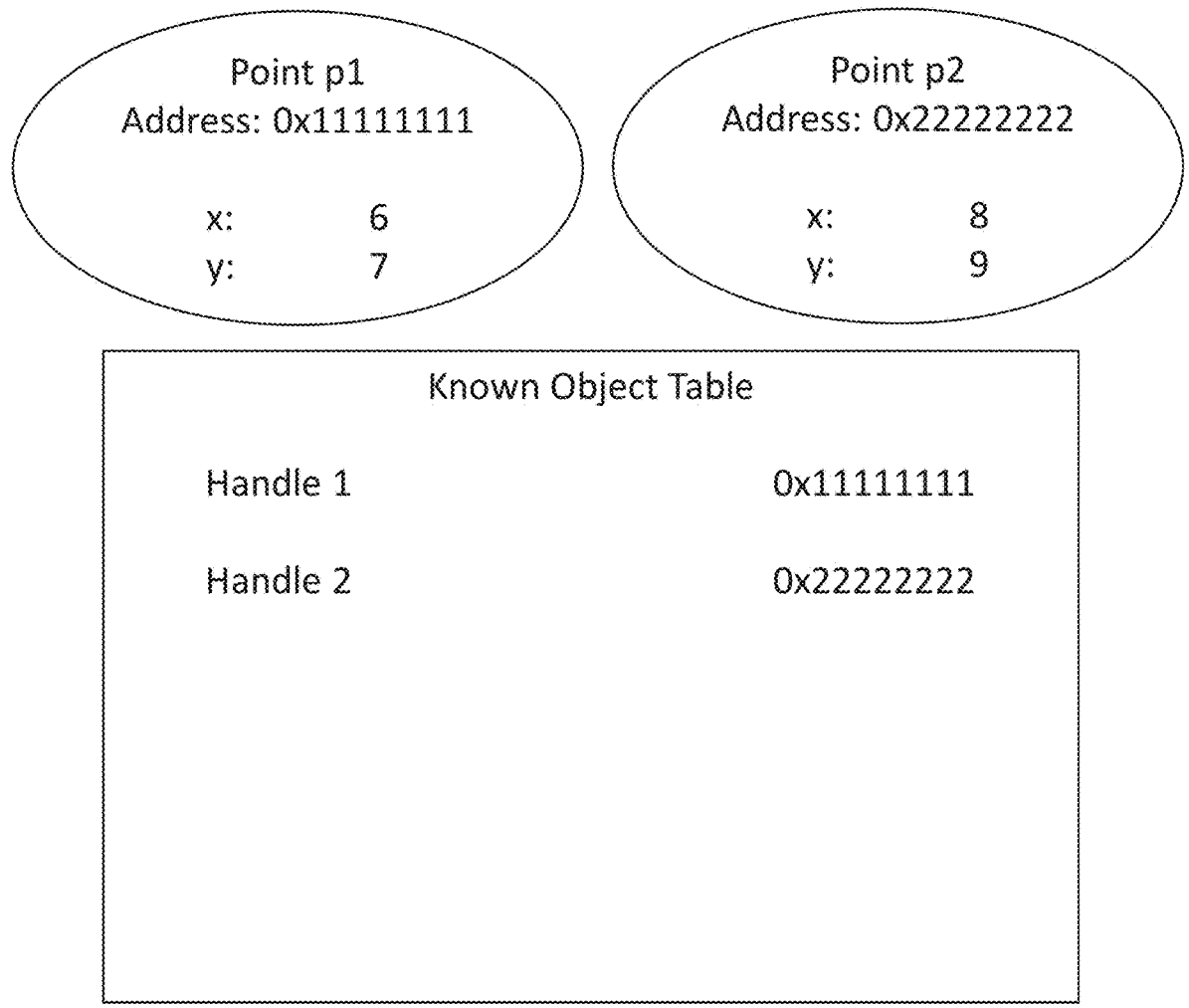

The system then reads the values 8 and 9 as data for the fields of the Point object. The system may recognize that it has read all field values for the Point object, and instantiate the Point object by invoking the selected constructor using the read field values. In particular, the constructor can instantiate a Point object p2 having the value 8 in the x field and the value 9 in the y field. As part of an atomic operation, the system also creates a handle (e.g., handle 2) in the Known Object Table and associates the handle with the address of the object, as shown in FIG. 13B.

Figure 13C:
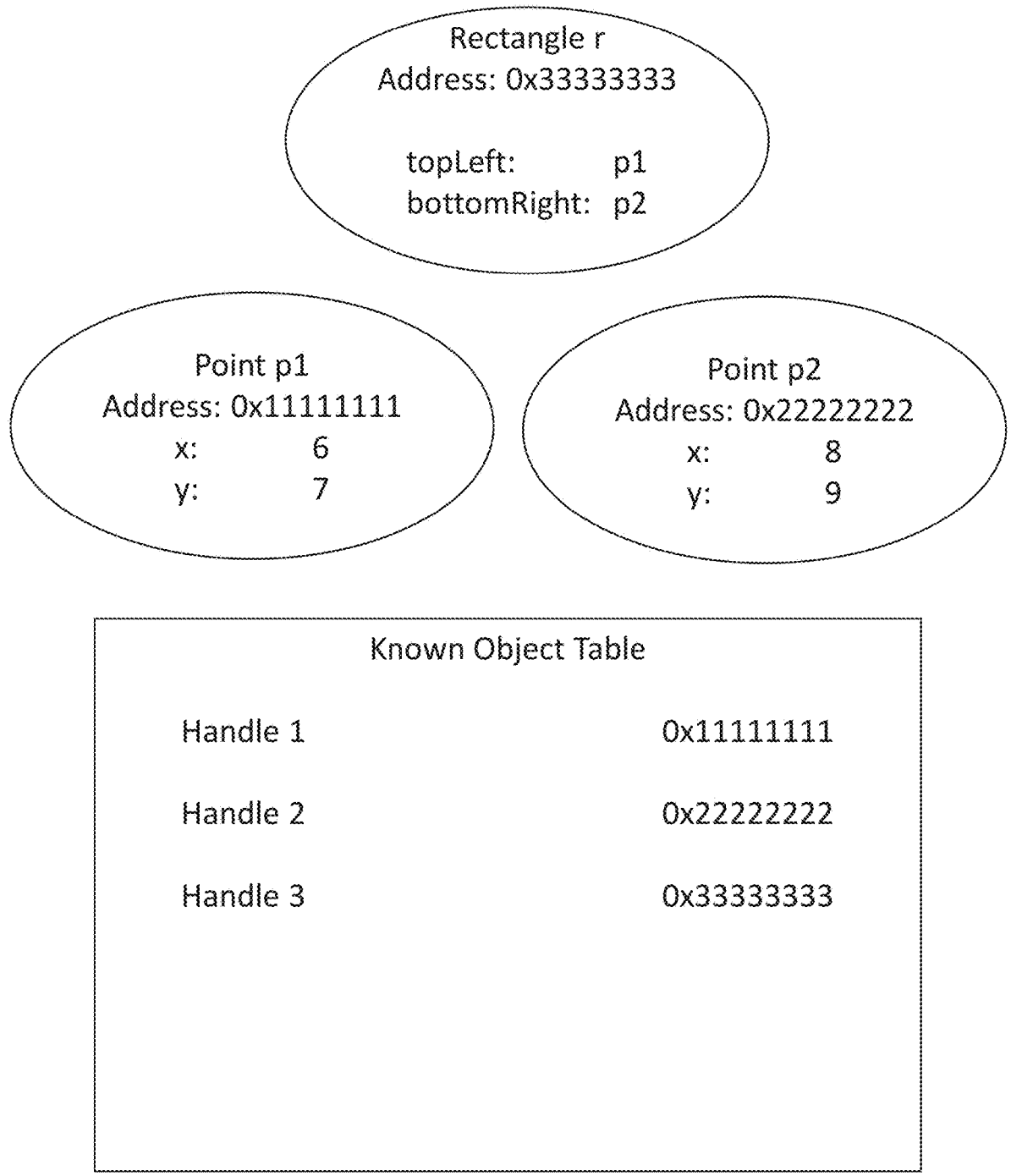

The system may recognize that it has read all field values for the Rectangle object, and instantiate the Rectangle object by invoking the selected constructor using the read field values. In particular, the constructor can instantiate a Rectangle object r having the value Point p1 in the topLeft field and the value Point p2 in the bottomRight field. As part of an atomic operation, the system also creates a handle (e.g., handle 3) in the Known Object Table and associates the handle with the address of the object, as shown in FIG. 13C.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
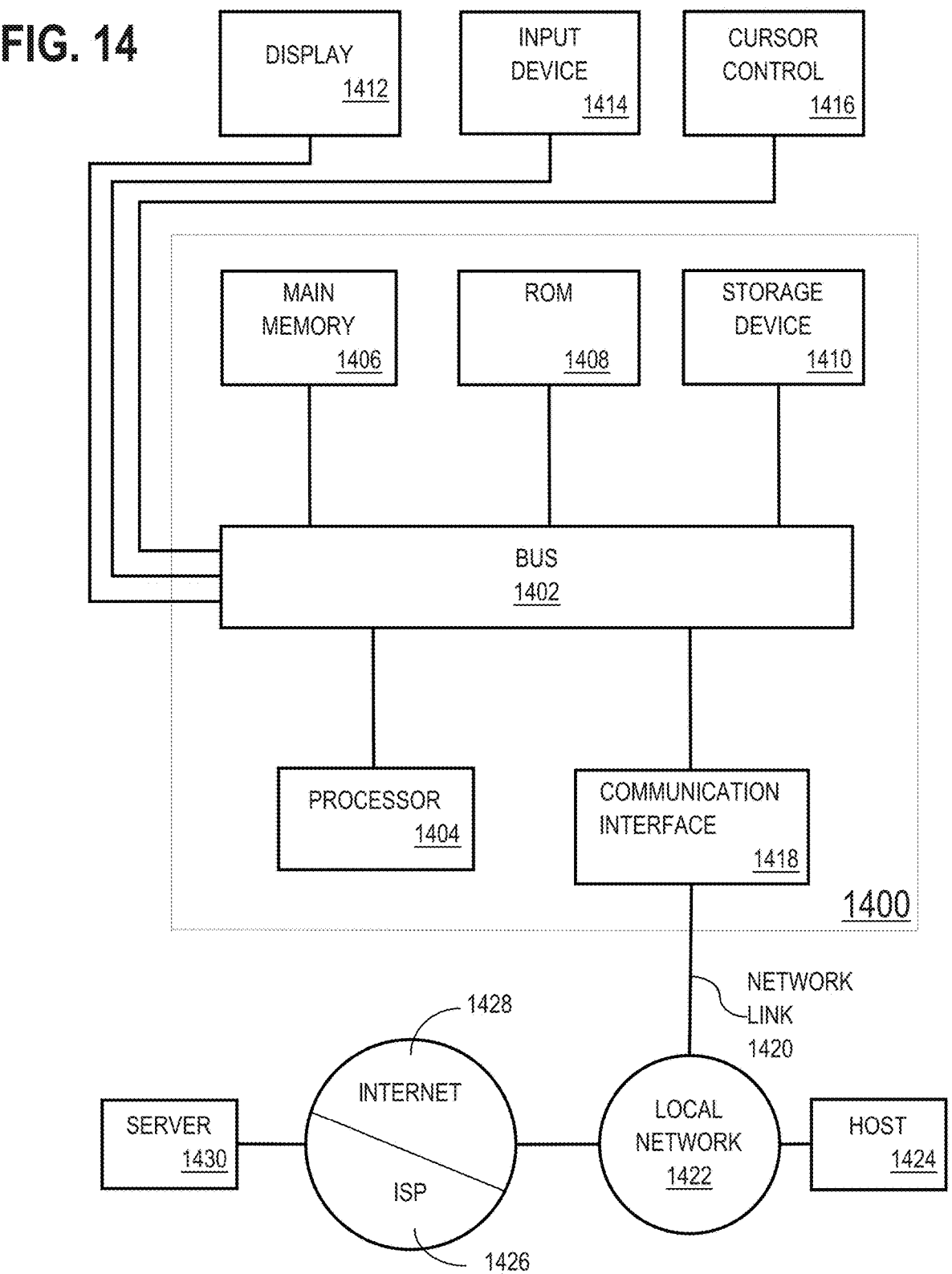
FIG. 14 illustrates a system in accordance with one or more embodiments.

For example, FIG. 14 is a block diagram that illustrates a computer system 1400 upon which an embodiment of the invention may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution. In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:
    receiving first data representing a first stream object, the first data including a first object descriptor, a first class descriptor, and first stream field values corresponding to the first stream object;
    based at least in part on the first data, determining that the first stream object is of an immutable type;
    responsive at least to determining that the first stream object is of the immutable type:
        selecting a first deserialization process, from among a plurality of deserialization processes; and
        deserializing the first data representing the first stream object using the first deserialization process, yielding a first set of one or more deserialized objects;
    receiving second data representing a second stream object, the second data including a second object descriptor, a second class descriptor, and second stream field values corresponding to the second stream object;
    based at least in part on the second data, determining that the second stream object is of a mutable type;
    responsive at least to determining that the second stream object is of the mutable type:
        selecting a second deserialization process, from among the plurality of deserialization processes; and
        deserializing the second data representing the second stream object using the second deserialization process, yielding a second set of one or more deserialized objects.

2. The one or more media of claim 1, wherein at least one deserialization process in the plurality of deserialization processes comprises, for a particular stream object:
    generating a first handle for the particular stream object;
    determining a type identified by the particular stream object;
    allocating memory for a deserialized object having the determined type and assigning default values for each field of the object;
    associating the first handle with a first memory address, wherein the first memory address comprises the memory address of memory allocated for the deserialized object;
    reading one or more stream field values; and
    assigning deserialized values for each field of the deserialized object based on the one or more read stream field values.

3. The one or more media of claim 1, wherein at least one deserialization process in the plurality of deserialization processes comprises, for a particular stream object:
    generating a first handle for the particular stream object;
    associating the first handle with a sentinel value;
    reading one or more stream field values;
    instantiating a deserialized object corresponding to the particular stream object by invoking a canonical constructor, wherein the deserialized object comprises fields having values corresponding to the one or more read stream field values; and
    subsequent to instantiating the deserialized object: removing the association between the first handle and the sentinel value and associating the first handle with a memory address at which the deserialized object is stored.

4. The one or more media of claim 1, wherein at least one deserialization process in the plurality of deserialization processes comprises, for a particular stream object:
generating a first handle for the particular stream object;
associating the first handle with a sentinel value;
reading one or more stream field values;
creating a deserialized object corresponding to the particular stream object, wherein the deserialized object comprises fields having values corresponding to the one or more read stream field values; and
subsequent to creating the deserialized object: removing the association between the first handle and the sentinel value and associating the first handle with a memory address at which the deserialized object is stored.

5. The one or more media of claim 1, wherein at least one deserialization process in the plurality of deserialization processes comprises, for a particular stream object:
reading one or more stream field values;
creating a deserialized object corresponding to the particular stream object, wherein the deserialized object comprises fields having values corresponding to the one or more read stream field values; and
subsequent to creating the deserialized object: generating a first handle for the stream object and associating the first handle with a memory address at which the deserialized object is stored.

6. The one or more media of claim 1, further comprising:
receiving third data representing a third stream object, the third data including a third object descriptor, a third class descriptor, and third stream field values corresponding to the third stream object;
determining that the third data representing the third stream object does not include any circular references;
responsive to determining that the third data representing the third stream object does not include any circular references, selecting a deserialization process from the plurality of deserialization processes,
wherein determining that the third data representing the third stream object not being involved in any circular references comprises determining that no stream field value of the third stream object refers directly or indirectly to the stream object.

7. The one or more media of claim 1, further comprising:
receiving third data representing a third stream object, the third data including a third object descriptor, a third class descriptor, and third stream field values corresponding to the third stream object;
determining that only a canonical constructor associated with a type indicated by the third class descriptor exists;
responsive to determining that only the canonical constructor associated with the type indicated by the third class descriptor exists, selecting a deserialization process from the plurality of deserialization processes.

8. The one or more media of claim 1, further comprising:
receiving third data representing a third stream object, the third data including a third object descriptor, a third class descriptor, and third stream field values corresponding to the third stream object;
determining that objects of a type indicated by the third class descriptor are immutable;
responsive to determining that objects of the type indicated by the third class descriptor are immutable, selecting a deserialization process from the plurality of deserialization processes.

9. The one or more media of claim 1, further comprising:
receiving third data representing a third stream object, the third data including a third object descriptor, a third class descriptor, and third stream field values corresponding to the third stream object;
determining that the third class descriptor indicates a record type;
responsive to determining that the third class descriptor indicates a record type, selecting a deserialization process from the plurality of deserialization processes.

10. A method comprising:
receiving first data representing a first stream object, the first data including a first object descriptor, a first class descriptor, and first stream field values corresponding to the first stream object;
based at least in part on the first data, determining that the first stream object is of an immutable type;
responsive at least to determining that the first stream object is of the immutable type:
selecting a first deserialization process, from among a plurality of deserialization processes; and
deserializing the first data representing the first stream object using the first deserialization process, yielding a first set of one or more deserialized objects;
receiving second data representing a second stream object, the second data including a second object descriptor, a second class descriptor, and second stream field values corresponding to the second stream object;
based at least in part on the second data, determining that the second stream object is of a mutable type;
responsive at least to determining that the second stream object is of the mutable type:
selecting a second deserialization process, from among the plurality of deserialization processes; and
deserializing the second data representing the second stream object using the second deserialization process, yielding a second set of one or more deserialized objects,
wherein the method is performed by at least one device including a hardware processor.

11. The method of claim 10, wherein at least one deserialization process in the plurality of deserialization processes comprises, for a particular stream object:
generating a first handle for the particular stream object;
determining a type identified by the particular stream object;
allocating memory for a deserialized object having the determined type and assigning default values for each field of the object;
associating the first handle with a first memory address, wherein the first memory address comprises the memory address of memory allocated for the deserialized object;
reading one or more stream field values; and
assigning deserialized values for each field of the deserialized object based on the one or more read stream field values.

12. The method of claim 10, wherein at least one deserialization process in the plurality of deserialization processes comprises, for a particular stream object:
generating a first handle for the particular stream object;
associating the first handle with a sentinel value;
reading one or more stream field values;
instantiating a deserialized object corresponding to the particular stream object by invoking a canonical constructor, wherein the deserialized object comprises fields having values corresponding to the one or more read stream field values; and subsequent to instantiating the deserialized object: removing the association between the first handle and the sentinel value and associating the first handle with a memory address at which the deserialized object is stored.

13. The method of claim 10, wherein at least one deserialization process in the plurality of deserialization processes comprises, for a particular stream object:

generating a first handle for the particular stream object;
associating the first handle with a sentinel value;
reading one or more stream field values;
creating a deserialized object corresponding to the particular stream object, wherein the deserialized object comprises fields having values corresponding to the one or more read stream field values; and
subsequent to creating the deserialized object: removing the association between the first handle and the sentinel value and associating the first handle with a memory address at which the deserialized object is stored.

14. The method of claim 10, wherein at least one deserialization process in the plurality of deserialization processes comprises, for a particular stream object:

reading one or more stream field values;
creating a deserialized object corresponding to the particular stream object, wherein the deserialized object comprises fields having values corresponding to the one or more read stream field values; and
subsequent to creating the deserialized object: generating a first handle for the stream object and associating the first handle with a memory address at which the deserialized object is stored.

15. The method of claim 10, further comprising:

receiving third data representing a third stream object, the third data including a third object descriptor, a third class descriptor, and third stream field values corresponding to the third stream object;
determining that the third data representing the third stream object does not include any circular references;
responsive to determining that the third data representing the third stream object does not include any circular references, selecting a deserialization process from the plurality of deserialization processes,
wherein determining that the third data representing the third stream object not being involved in any circular references comprises determining that no stream field value of the third stream object refers directly or indirectly to the stream object.

16. The method of claim 10, further comprising:

receiving third data representing a third stream object, the third data including a third object descriptor, a third class descriptor, and third stream field values corresponding to the third stream object;
determining that only a canonical constructor associated with a type indicated by the third class descriptor exists;
responsive to determining that only the canonical constructor associated with the type indicated by the third class descriptor exists, selecting a deserialization process from the plurality of deserialization processes.

17. The method of claim 10, further comprising:

receiving third data representing a third stream object, the third data including a third object descriptor, a third class descriptor, and third stream field values corresponding to the third stream object;

determining that objects of a type indicated by the third class descriptor are immutable;
responsive to determining that objects of the type indicated by the third class descriptor are immutable, selecting a deserialization process from the plurality of deserialization processes.

18. The method of claim 10, further comprising:

receiving third data representing a third stream object, the third data including a third object descriptor, a third class descriptor, and third stream field values corresponding to the third stream object;
determining that the third class descriptor indicates a record type;
responsive to determining that the third class descriptor indicates a record type, selecting a deserialization process from the plurality of deserialization processes.

19. A system comprising:

at least one hardware processor;
the system being configured to perform operations comprising:
receiving first data representing a first stream object, the first data including a first object descriptor, a first class descriptor, and first stream field values corresponding to the first stream object;
based at least in part on the first data, determining that the first stream object is of an immutable type;
responsive at least to determining that the first stream object is of the immutable type:
selecting a first deserialization process, from among a plurality of deserialization processes; and
deserializing the first data representing the first stream object using the first deserialization process, yielding a first set of one or more deserialized objects;
receiving second data representing a second stream object, the second data including a second object descriptor, a second class descriptor, and second stream field values corresponding to the second stream object;
based at least in part on the second data, determining that the second stream object is of a mutable type;
responsive at least to determining that the second stream object is of the mutable type:
selecting a second deserialization process, from among the plurality of deserialization processes; and
deserializing the second data representing the second stream object using the second deserialization process, yielding a second set of one or more deserialized objects.

20. The system of claim 19, wherein at least one deserialization process in the plurality of deserialization processes comprises, for a particular stream object:

generating a first handle for the particular stream object;
determining a type identified by the particular stream object;
allocating memory for a deserialized object having the determined type and assigning default values for each field of the object;
associating the first handle with a first memory address, wherein the first memory address comprises the memory address of memory allocated for the deserialized object;
reading one or more stream field values; and
assigning deserialized values for each field of the deserialized object based on the one or more read stream field values.

21. The system of claim 19, wherein at least one deserialization process in the plurality of deserialization processes comprises, for a particular stream object:

generating a first handle for the particular stream object;
associating the first handle with a sentinel value;
reading one or more stream field values;
instantiating a deserialized object corresponding to the particular stream object by invoking a canonical constructor, wherein the deserialized object comprises fields having values corresponding to the one or more read stream field values; and
subsequent to instantiating the deserialized object: removing the association between the first handle and the sentinel value and associating the first handle with a memory address at which the deserialized object is stored.

22. The system of claim 19, wherein at least one deserialization process in the plurality of deserialization processes comprises, for a particular stream object:
generating a first handle for the particular stream object;
associating the first handle with a sentinel value;
reading one or more stream field values;
creating a deserialized object corresponding to the particular stream object, wherein the deserialized object comprises fields having values corresponding to the one or more read stream field values; and
subsequent to creating the deserialized object: removing the association between the first handle and the sentinel value and associating the first handle with a memory address at which the deserialized object is stored.

23. The system of claim 19, wherein at least one deserialization process in the plurality of deserialization processes comprises, for a particular stream object:
reading one or more stream field values;
creating a deserialized object corresponding to the particular stream object, wherein the deserialized object comprises fields having values corresponding to the one or more read stream field values; and
subsequent to creating the deserialized object: generating a first handle for the stream object and associating the first handle with a memory address at which the deserialized object is stored.

24. The system of claim 19, further comprising:
receiving third data representing a third stream object, the third data including a third object descriptor, a third class descriptor, and third stream field values corresponding to the third stream object;
determining that the third data representing the third stream object does not include any circular references;
responsive to determining that the third data representing the third stream object does not include any circular references, selecting a deserialization process from the plurality of deserialization processes,
wherein determining that the third data representing the third stream object not being involved in any circular references comprises determining that no stream field value of the third stream object refers directly or indirectly to the stream object.

25. The system of claim 19, further comprising:
receiving third data representing a third stream object, the third data including a third object descriptor, a third class descriptor, and third stream field values corresponding to the third stream object;
determining that only a canonical constructor associated with a type indicated by the third class descriptor exists;
responsive to determining that only the canonical constructor associated with the type indicated by the third class descriptor exists, selecting a deserialization process from the plurality of deserialization processes.

26. The system of claim 19, further comprising:
receiving third data representing a third stream object, the third data including a third object descriptor, a third class descriptor, and third stream field values corresponding to the third stream object;
determining that objects of a type indicated by the third class descriptor are immutable;
responsive to determining that objects of the type indicated by the third class descriptor are immutable, selecting a deserialization process from the plurality of deserialization processes.

27. The system of claim 19, further comprising:
receiving third data representing a third stream object, the third data including a third object descriptor, a third class descriptor, and third stream field values corresponding to the third stream object;
determining that the third class descriptor indicates a record type;
responsive to determining that the third class descriptor indicates a record type, selecting a deserialization process from the plurality of deserialization processes.

* * * * *

UNITED STATES PATENT AND TRADEMARK OFFICE
CERTIFICATE OF CORRECTION

PATENT NO. : 11,599,551 B2  
APPLICATION NO. : 16/834239  
DATED : March 7, 2023  
INVENTOR(S) : Hegarty et al.

Page 1 of 2

It is certified that error appears in the above-identified patent and that said Letters Patent is hereby corrected as shown below:

On the Title Page

On page 2, Column 2, item [56] under Other Publications, Lines 8-9, delete "©ToString , ©EqualsAndHashCode , ©Getter" and insert -- @ToString, @EqualsAndHashCode, @Getter --, therefor.

On page 2, Column 2, item [56] under Other Publications, Line 9, delete "©Setter" and insert -- @Setter --, therefor.

On page 2, Column 2, item [56] under Other Publications, Line 10, delete "©RequiredArgsConstructor," and insert -- @RequiredArgsConstructor, --, therefor.

On page 2, Column 2, item [56] under Other Publications, Line 14, delete "availvle" and insert -- available --, therefor.

On page 2, Column 2, item [56] under Other Publications, Line 14, delete "https://projectlornbok.org/" and insert -- https://projectlombok.org/ --, therefor.

On page 2, Column 2, item [56] under Other Publications, Line 31, delete "avaolable" and insert -- available --, therefor.

On page 2, Column 2, item [56] under Other Publications, Line 31, delete "https://cr.openjdkjava.net/" and insert -- https://cr.openjdk.java.net/ --, therefor.

On page 2, Column 2, item [56] under Other Publications, Line 32, delete ">,11 pages." and insert -- >, 11 pages. --, therefor.

In the Drawings

On sheet 11 of 29, in FIG. 11A, Line 3, delete "topLeft" and insert -- topLeft: --, therefor.

Signed and Sealed this  
Second Day of January, 2024

Katherine Kelly Vidal  
*Director of the United States Patent and Trademark Office*

CERTIFICATE OF CORRECTION (continued)
U.S. Pat. No. 11,599,551 B2

On sheet 11 of 29, in FIG. 11A, Line 4, delete "bottomRight" and insert -- bottomRight: --, therefor.

On sheet 19 of 29, in FIG. 12C, Line 7, delete "Handle2" and insert -- Handle 2 --, therefor.

On sheet 20 of 29, in FIG. 12D, Line 7, delete "Handle2" and insert -- Handle 2 --, therefor.

On sheet 22 of 29, in FIG. 12F, Line 7, delete "Handle2" and insert -- Handle 2 --, therefor.

On sheet 23 of 29, in FIG. 12G, Line 7, delete "Handle2" and insert -- Handle 2 --, therefor.

On sheet 24 of 29, in FIG. 12H, Line 11, delete "Handle2" and insert -- Handle 2 --, therefor.

On sheet 25 of 29, in FIG. 12J, Line 11, delete "Handle2" and insert -- Handle 2 --, therefor.

On sheet 25 of 29, in FIG. 12J, delete "FIG. 12J" and insert -- FIG. 12I --, therefor.

On sheet 26 of 29, in FIG. 13A, Line 3, delete "x" and insert -- x: --, therefor.

On sheet 26 of 29, in FIG. 13A, Line 4, delete "y" and insert -- y: --, therefor.

In the Specification

In Column 20, Line 47, delete "where" and insert -- Where --, therefor.

In Column 26, Line 17, delete "descriptor" and insert -- descriptor> --, therefor.